US011030097B2

(12) United States Patent
Rose et al.

(10) Patent No.: US 11,030,097 B2
(45) Date of Patent: **\*Jun. 8, 2021**

(54) VERIFYING THE VALIDITY OF A TRANSITION FROM A CURRENT TAIL TEMPLATE TO A NEW TAIL TEMPLATE FOR A FUSED OBJECT

(71) Applicant: Oracle International Corporation, Redwood Shores, CA (US)

(72) Inventors: John R. Rose, San Jose, CA (US); Paul D. Sandoz, Campbell, CA (US)

(73) Assignee: Oracle International Corporation, Redwood Shores, CA (US)

( * ) Notice: Subject to any disclaimer, the term of this patent is extended or adjusted under 35 U.S.C. 154(b) by 63 days.

This patent is subject to a terminal disclaimer.

(21) Appl. No.: 16/518,611

(22) Filed: Jul. 22, 2019

(65) Prior Publication Data

US 2019/0347199 A1 Nov. 14, 2019

Related U.S. Application Data

(63) Continuation of application No. 15/906,114, filed on Feb. 27, 2018, now Pat. No. 10,402,320.

(51) Int. Cl.
*G06F 12/06* (2006.01)

(52) U.S. Cl.
CPC .. *G06F 12/0646* (2013.01); *G06F 2212/1032* (2013.01); *G06F 2212/251* (2013.01)

(58) Field of Classification Search
CPC ......... G06F 12/0646; G06F 2212/2032; G06F 2212/251

See application file for complete search history.

(56) References Cited

U.S. PATENT DOCUMENTS

| | | |
|---|---|---|
| 6,763,440 B1 | 7/2004 | Traversat et al. |
| 6,985,901 B1 | 1/2006 | Sachse et al. |
| 7,254,509 B1 * | 8/2007 | Johnson ............ G01R 31/3187 702/117 |
| 7,716,449 B2 | 5/2010 | Kessler |
| 8,141,068 B1 | 3/2012 | Thompson |

(Continued)

OTHER PUBLICATIONS

S. Hu and J. E. Smith, "Using dynamic binary translation to fuse dependent instructions," International Symposium on Code Generation and Optimization, 2004. CGO 2004., San Jose, CA, USA, 2004, pp. 213-224.*

(Continued)

*Primary Examiner* — Pierre Miche Bataille
(74) *Attorney, Agent, or Firm* — Invoke

(57) ABSTRACT

Techniques relating to fused objects are disclosed. Embodiments include verifying the validity of a transition from a current tail template to a new tail template for a fused object. The validity of the transition is determined by analyzing the type transitions per memory slot. If the type transition, for each memory slot, constitutes a type-compatible transition, then the transition from the current tail template to the new tail template is valid. If the type transition, for any memory slot, is not type-compatible, then the transition from the current tail template to the new tail template is not valid. Embodiments include generating a fused object with a repeating tail. A tail template associated with a fused object is repeated multiple times in the tail of the fused object.

20 Claims, 15 Drawing Sheets

(56) References Cited

U.S. PATENT DOCUMENTS

| | | | |
|---|---|---|---|
| 8,578,269 B2* | 11/2013 | Osaka | G06F 40/103 |
| | | | 715/253 |
| 8,631,219 B2 | 1/2014 | Thomas et al. | |
| 9,021,455 B2 | 4/2015 | Chapman et al. | |
| 9,164,841 B2* | 10/2015 | Resch | G06F 11/1088 |
| 10,042,751 B1* | 8/2018 | Veprinsky | G06F 3/0649 |
| 2004/0034830 A1 | 2/2004 | Fuchs et al. | |
| 2004/0120339 A1* | 6/2004 | Ronciak | H04L 49/901 |
| | | | 370/429 |
| 2006/0136810 A1* | 6/2006 | Truong | G06F 40/174 |
| | | | 715/222 |
| 2007/0168949 A1 | 7/2007 | Shattuck et al. | |
| 2009/0077371 A1 | 3/2009 | Powell et al. | |
| 2010/0281331 A1* | 11/2010 | Hammons, Jr. | H04L 1/1812 |
| | | | 714/752 |
| 2014/0040662 A1* | 2/2014 | Dhuse | H04L 67/1097 |
| | | | 714/6.23 |
| 2014/0122636 A1* | 5/2014 | Peake | H04L 67/1097 |
| | | | 709/213 |
| 2014/0211884 A1* | 7/2014 | Lee | H03M 13/2933 |
| | | | 375/296 |
| 2016/0294735 A1* | 10/2016 | Panchagnula | H04L 49/9005 |
| 2018/0024814 A1 | 1/2018 | Ouali | |

OTHER PUBLICATIONS

Boehm, Matthias • Reinwald, Berthold • Hutchison, Dylan • Evfimievski, Alexandre V. • Sen, Prithviraj, "On Optimizing Operator Fusion Plans for Large-Scale Machine Learning in SystemML", Computer Science—Databases, arxiv.org, Jan. 2, 2018.*

D. -. R. Ju, Chuan-Lin Wu and P. Carini, "The classification, fusion, and parallelization of array language primitives," in IEEE Transactions on Parallel and Distributed Systems, vol. 5, No. 10, pp. 1113-1120, Oct. 1994.*

Arrays [ 2.0 64 ]—opportunities and challenges, John R. Rose, Da Vinci Machine Project, 2012.

Maxine-VM/ Hybrid.jave at master. beehive-lab/Maxine-VM. GitHub. https://github.com/beehive-lab/Maxine-VM/blob/master/com.oracle. max.vm/src/com/sun/max/vm/object/Hybrid.java, May 18, 2011.

Maxine-VMHybrid.java at master—beehive-labMaxine-VM—GitHub, https://github.com/beehive-lab/Maxine-VM/blob/master/com.oracle.max.vm/src/com/sun/max/vm/object/Hybrid.java, Mar. 23, 2018.

Serkan Ozal, Dangerous code: How to be Unsafe with Java classes & objects in memory, How can we get the memory address of a Class, Nov. 19, 2013.

Wimmer and Mossenbock, Automatic feedback-directed object fusing, ACM Transactions on Architecture and Code Optimization, vol. 7, No. 2, Article 7, Sep. 2010.

* cited by examiner

VERIFYING THE VALIDITY OF A TRANSITION FROM A CURRENT TAIL TEMPLATE TO A NEW TAIL TEMPLATE FOR A FUSED OBJECT

INCORPORATION BY REFERENCE; DISCLAIMER

The following application is hereby incorporated by reference: application Ser. No. 15/906,114 filed on Feb. 27, 2018. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to fused objects. In particular, the present disclosure relates to verifying the validity of a transition from a current tail template to a new tail template for a fused object.

BACKGROUND

A compiler converts source code, which is written according to a specification directed to the convenience of the programmer, to machine or object code. Machine or object code is executable directly by the particular machine environment. Alternatively, a compiler converts source code to an intermediate representation ("virtual machine code/instructions"), such as bytecode, which is executable by a virtual machine that is capable of running on top of a variety of particular machine environments. The virtual machine instructions are executable by the virtual machine in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine resides.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
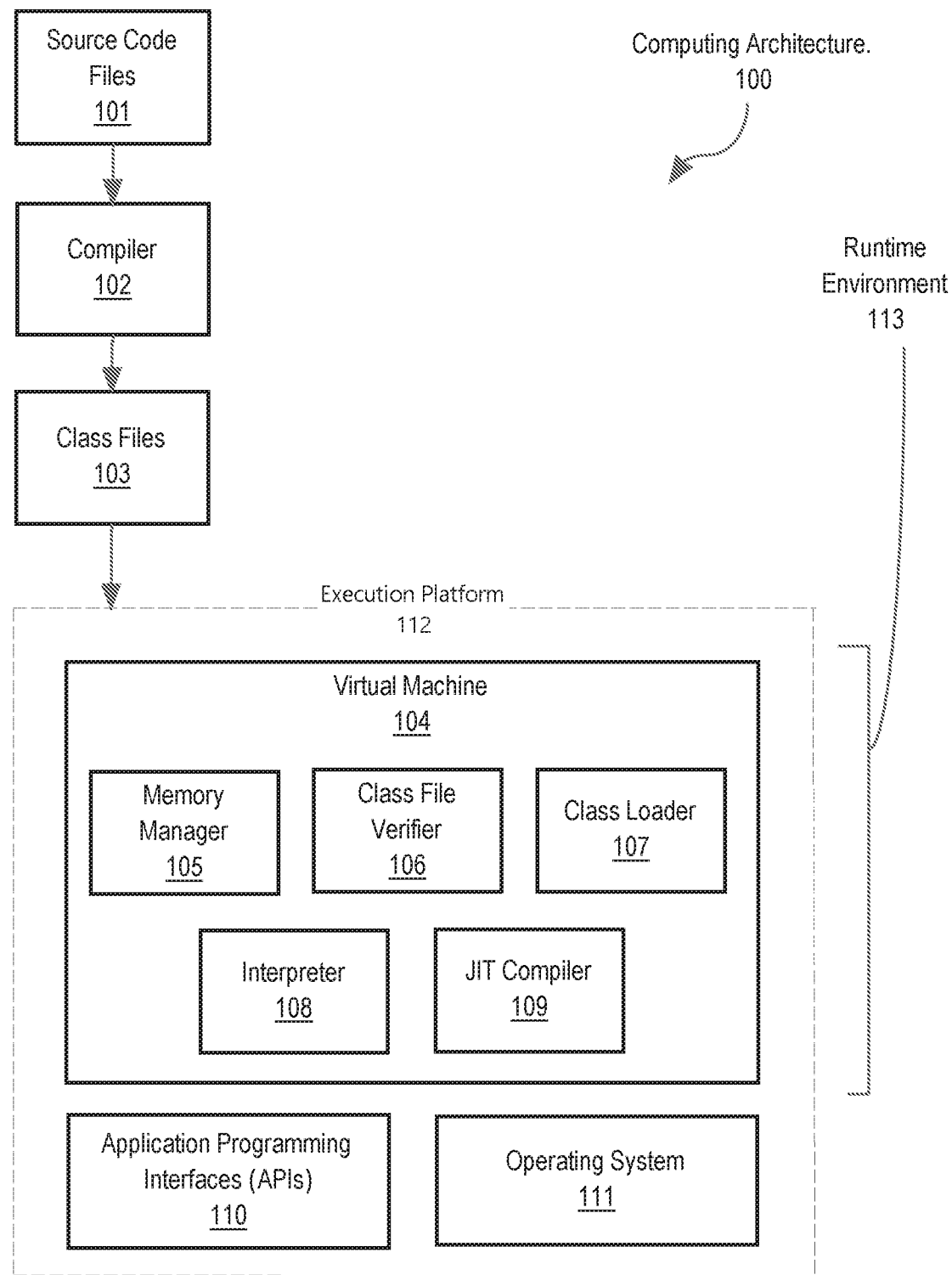
FIG. 1 illustrates an example computing architecture in which techniques described herein may be practiced.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
  2. ARCHITECTURAL OVERVIEW
    2.1 EXAMPLE CLASS FILE STRUCTURE
    2.2 EXAMPLE VIRTUAL MACHINE ARCHITECTURE
    2.3 LOADING, LINKING, AND INITIALIZING
  3. MEMORY LAYOUT FOR AN OBJECT
  4. MEMORY LAYOUT AND TAIL TEMPLATE FOR A FUSED OBJECT
  5. VERIFYING WHETHER A TRANSITION, FOR A FUSED OBJECT, FROM A CURRENT TAIL TEMPLATE TO A NEW TAIL TEMPLATE IS VALID
  6. GENERATING A FUSED OBJECT WITH A REPEATING TAIL

7. GENERATING A MAP OF POINTERS IN MEMORY BASED ON TAIL TEMPLATES
8. MISCELLANEOUS; EXTENSIONS
9. HARDWARE OVERVIEW

1. General Overview

One or more embodiments relate to a fused object. A fused object is an object with a head and a tail. A memory layout for the fused object includes a set of memory slots. Each memory slot is associated with a type. A head template defines the memory layout for the head of the fused object. The head template specifies a set of types for memory slots within the head. A tail template defines the memory layout for the tail of the fused object. The tail template specifies a set of types for memory slots within the tail. The head template, and hence the memory layout for the head, is not modifiable. The tail template, and hence the memory layout for the tail, is modifiable. A fused object may be associated with a particular tail template, and later be associated with a different tail template.

One or more embodiments include verifying whether a transition, for a fused object, from a current tail template to a new tail template is valid. An instruction to associate a fused object with a new tail template is identified. The validity of the transition from a current tail template to the new tail template is determined by analyzing the type transitions per memory slot. The types assigned to each respective memory slot within the tail of the fused object, as defined by the current tail template, are identified. The types that would be assigned to each respective memory slot within the tail of the fused object, as defined by the new tail template, are identified. The transition from a type specified by the current tail template to a type specified by the new tail template, for a particular memory slot, may be referred to as a "type transition" for the particular memory slot. The system determines whether the type transition, for each memory slot, constitutes a type-compatible transition. If the type transition for each memory slot is type-compatible, then the transition from the current tail template to the new tail template is valid. Then the fused object is associated with the new tail template. The memory layout of the tail is modified from being defined by the current tail template to being defined by the new tail template. However, if the type transition for any memory slot is not type-compatible, then the transition from the current tail template to the new tail template is invalid. Then the fused object remains associated with the current tail template. The memory layout of the tail is not modified based on the new tail template. An error message indicating the invalid transition may be generated.

One or more embodiments include generating a fused object with a repeating tail. An instruction to instantiate a fused object is identified. A head template and a tail template for the fused object are identified. The memory layout for the head of the fused object includes the set of types specified by the head template. The memory layout for the tail of the fused object includes repetition of the set of types specified by the tail template. Stated differently, the tail template is repeated multiple times within the tail of the fused object. A size variable for the fused object may specify the number of times that the tail template is repeated within the tail. Alternatively, a size variable for the fused object may specify a memory size of the tail and/or the fused object. Locations of pointers within the memory layout for the tail of the fused object may be determined based on locations of pointers within the tail template, without necessarily inspecting the memory slots within the tail of the fused object.

One or more embodiments described in this Specification and/or recited in the claims may not be included in this General Overview section.

2. Architectural Overview

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
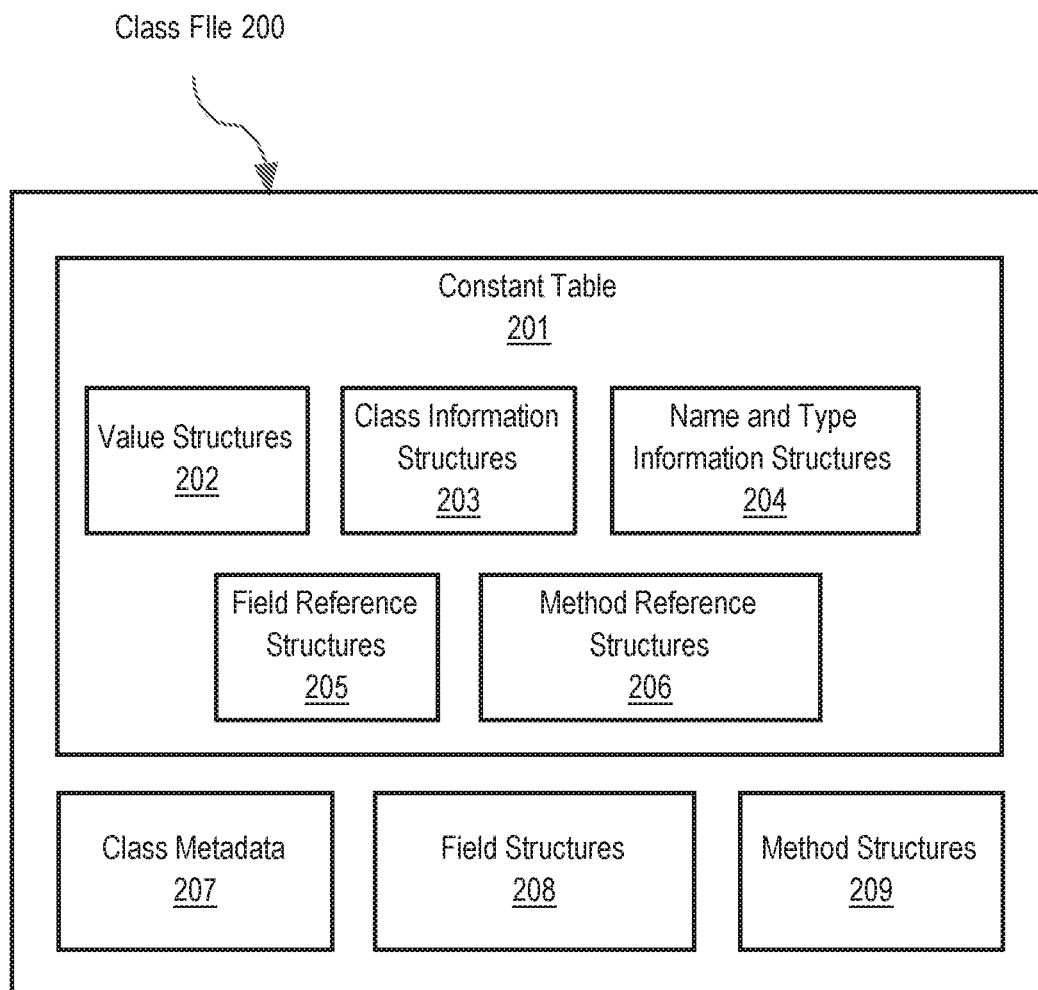
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A
{
    int add12and13( ) {
        return B.addTwo(12, 13);
    }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
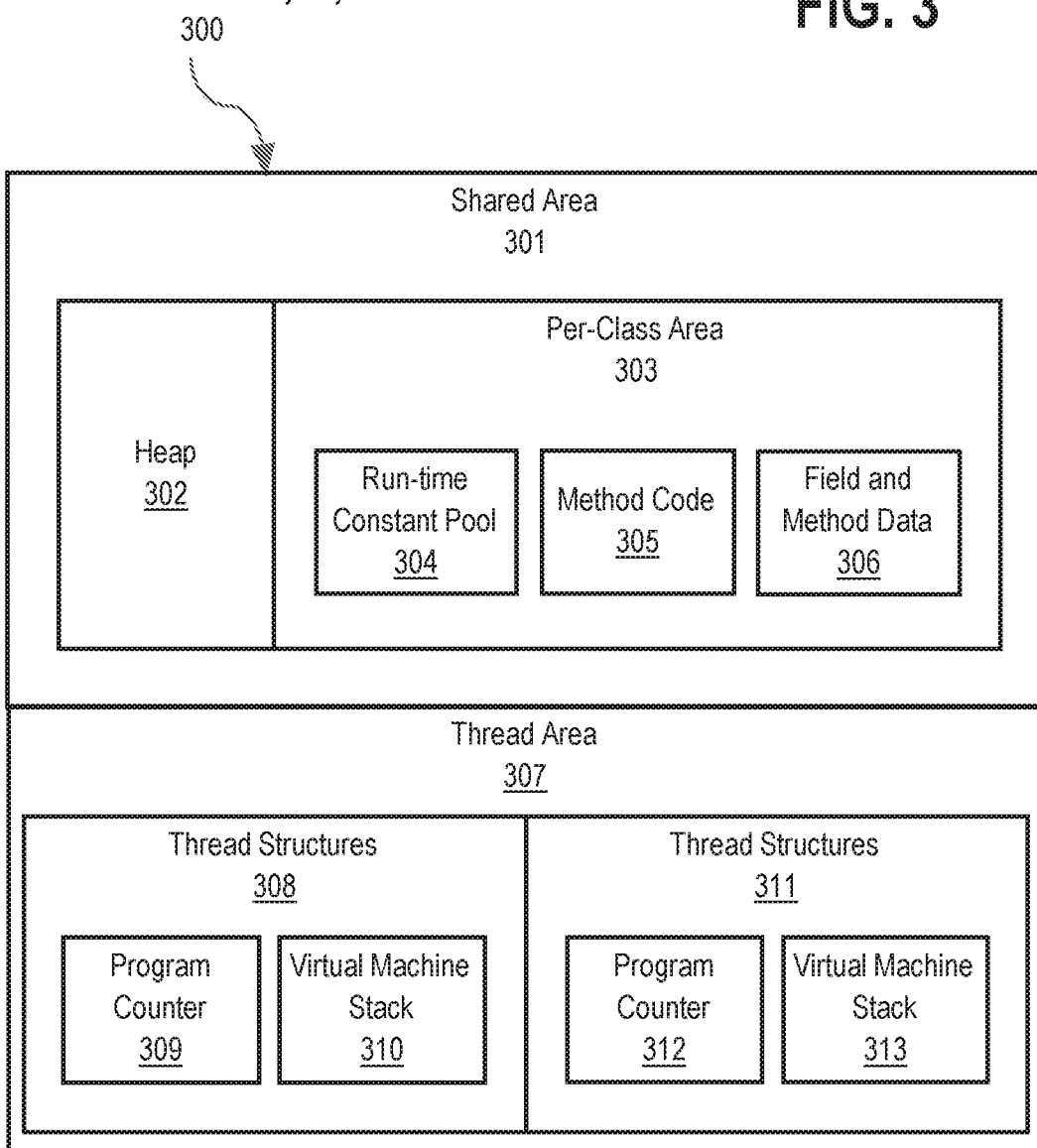
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
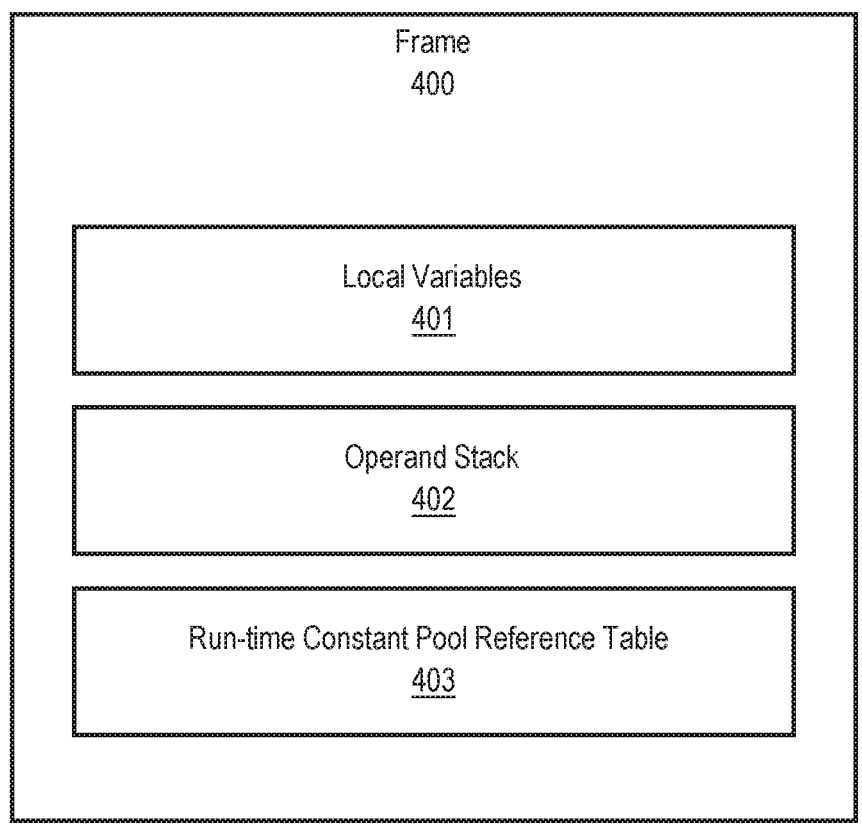
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Memory Layout for an Object

Figure 5A:
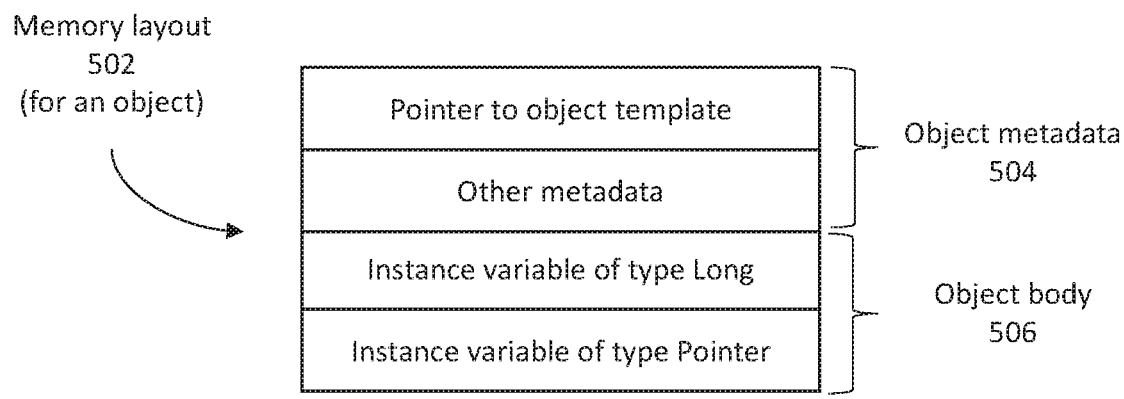
FIG. 5A illustrates an example memory layout for an object in accordance with one or more embodiments in the prior art.

FIG. 5A illustrates an example memory layout for an object in accordance with one or more embodiments in the prior art. As illustrated, a memory layout 502 for an object includes object metadata 504 and object body 506.

In one or more embodiments, a memory layout 502 for an object is a layout of the types associated with the variables of the object as stored in memory. The object may be stored in a heap memory (e.g., heap 302 of FIG. 3).

In an embodiment, a memory layout 502 for an object includes a set of memory slots. A value of a particular type may occupy one memory slot as long as the size of the particular type is less than or equal to the size of the memory slot. If the size of the particular type is less than the size of the memory slot, then the memory slot is only partially occupied. Additionally or alternatively, a value of a particular type may occupy two or more slots (the first memory slot and/or the last memory slot may be fully or partially occupied). As an example, a machine may have memory slots that are 8-byte wide. A value of type long may need 8 bytes. Hence, a value of type long may occupy one memory slot. Meanwhile, another machine may have memory slots that are 4-byte wide. A value of type long may need 8 bytes. Hence, a value of type long may occupy two memory slots.

The memory size of a memory slot may be different for different machines (such as, a physical machine and/or a virtual machine). As an example, a 64-bit machine may have memory slots that are 8-byte wide. A 32-bit machine may have memory slots that are 4-byte wide.

The size and/or arrangement of memory slots may be adjusted in various ways at the time that memory is allocated and/or at the time that an object is instantiated. Once a size of a memory slot is determined during a particular runtime, the size is fixed for the particular runtime. In an embodiment, a size of a memory slot may be adjusted based on the type assigned to the memory slot. As an example, the types integer and long may be assigned to a memory region. The type integer may occupy 4 bytes. The type long may occupy 8 bytes. Hence, a first memory slot of 4 bytes is given for the type integer. A next memory slot of 8 bytes is given for the type long. In an embodiment, the size of a memory slot is one byte. One or more memory slots may be given to a particular type, depending on the memory size that is needed for the particular type. As an example, the types integer and long may be assigned to a memory region. The type integer may occupy 4 bytes. The type long may occupy 8 bytes. Hence, four memory slots (each having a size of one byte) are given to the type integer. Eight memory slots are given to the type long. In an embodiment, padding may be used between memory slots. Padding may occur in order to align memory slots on certain boundaries for more efficient access.

In one or more embodiments, object metadata 504 is a portion of the memory layout 502 that stores metadata for the object. As illustrated, object metadata 504 includes a pointer to an object template 508 and/or other metadata for the object. Object template 508 is further discussed below with reference to FIG. 5B.

In one or more embodiments, object body 506 is a portion of the memory layout 502 that stores values for members of the object. Members of the object may include, for example, instance variables of the object. The types of the members of the object are specified by an object template 508. Object template 508 is further discussed below with reference to FIG. 5B.

Figure 5B:
FIG. 5B illustrates an example object template in accordance with one or more embodiments in the prior art.

FIG. 5B illustrates an example object template in accordance with one or more embodiments in the prior art. As illustrated, an object template 508 defines the memory layout for an object body 506 of an object. The object template 508 specifies a set of types for memory slots within the object body 506.

As an example, a set of code may declare the following classes:

```
class Book {
    long length;
    Author author;
}
class Author {
    String firstName;
    String lastName;
}
```

Based on the above code, the variable length is of the type long. The variable author is of the type pointer (pointing to an object of type Author).

An object template 508 for the class Book specifies the types long and pointer, as illustrated in FIG. 5B. Based on the object template 508, an object body 506 of an object of type Book includes a long instance variable and a pointer instance variable, as illustrated in FIG. 5A.

Executed in a 64-bit machine, the object of type Book may include one memory slot for the long variable and one memory slot for the pointer variable. Alternatively, executed in a 32-bit machine, the object of type Book may include two memory slots for the long variable and one memory slot for the pointer variable.

4. Memory Layout and Tail Template for a Fused Object

Figure 6A:
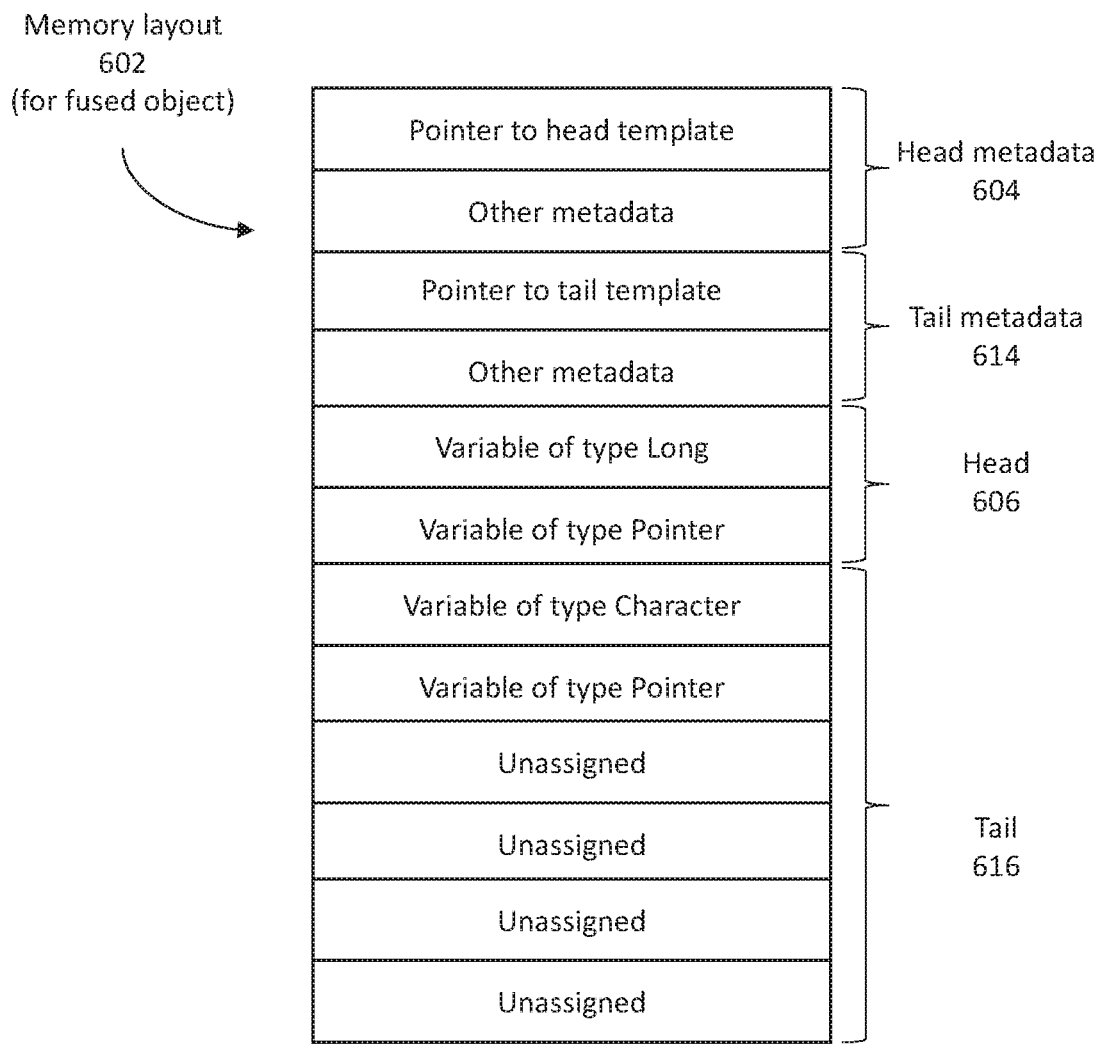
FIG. 6A illustrates an example memory layout for a fused object in accordance with one or more embodiments.

FIG. 6A illustrates an example memory layout for a fused object in accordance with one or more embodiments. As illustrated, a memory layout 602 for a fused object includes head metadata 604, tail metadata 614, a head 606, and a tail 616.

In one or more embodiments, a memory layout 602 for a fused object is a layout of the types associated with variables of the fused object as stored in memory. There are some similarities and some differences between the memory layout 602 for a fused object and the memory layout 502 for an object, as described above with reference to FIG. 5A. The object metadata 504 of an object may be similar to the head metadata 604 of a fused object. The object body 506 of an object may be similar to the head 606 of a fused object. A difference between the memory layout 502 and the memory layout 602 is that the memory layout 602 additionally includes tail metadata 614 and a tail 616.

In one or more embodiments, head metadata 604 is a portion of the memory layout 602 that stores metadata for the head 606 of a fused object. Head metadata 604 of the fused object is similar to object metadata 504. As illustrated, head metadata 604 includes a pointer to a head template and/or other metadata for the head 606. The head template defines the memory layout for a head 606 of a fused object. The head template specifies a set of types for memory slots within the head 606. In an embodiment, the head template for a fused object is the same as an object template 508 for an object.

In one or more embodiments, a head 606 of a fused object is a portion of the memory layout 602 that stores values for members of the head 606. Head 606 of the fused object is similar to object body 506. The types of the members of the head 606 are specified by a head template. The head 606 of a fused object includes variables as specified by a head template, just as the object body 506 of an object includes variables as specified by an object template 518.

In one or more embodiments, the head template for a fused object is not modifiable. The memory layout for the head 606 of a fused object is not modifiable. Once a head template is specified for an object, the head template cannot be changed. Since the head template cannot be changed, so the memory layout for the head 606 cannot be changed.

In one or more embodiments, tail metadata 614 is a portion of the memory layout 602 that stores metadata for the tail 616 of a fused object. As illustrated, tail metadata 614 includes a pointer to a tail template 618 and/or other metadata for the tail 616. Other metadata for the tail 616 may include, for example, a size variable indicating a memory size of the tail 616 and/or a memory size of the fused object.

In one or more embodiments, a tail 616 of a fused object is a portion of the memory layout 602 that stores values for members of the tail 616. The types of the members of the tail 616 are specified by a tail template 618.

A tail 616 may include memory slots whose types are defined by a tail template 618. Additionally or alternatively, a tail may include memory slots associated with the unassigned type. The unassigned type indicates that there has not yet been an actual type (such as integer, double, long, character, boolean, pointer) assigned to the memory slot. The memory slot may subsequently be assigned to an actual type. Additionally or alternatively, a tail may include memory slots associated with the deassigned type. The deassigned type indicates that the memory slot was previously assigned to an actual type (such as integer, double, long, character, boolean, pointer) but is no longer assigned to that type. The deassigned type may indicate that the memory slot is no longer in use.

Figure 6B:
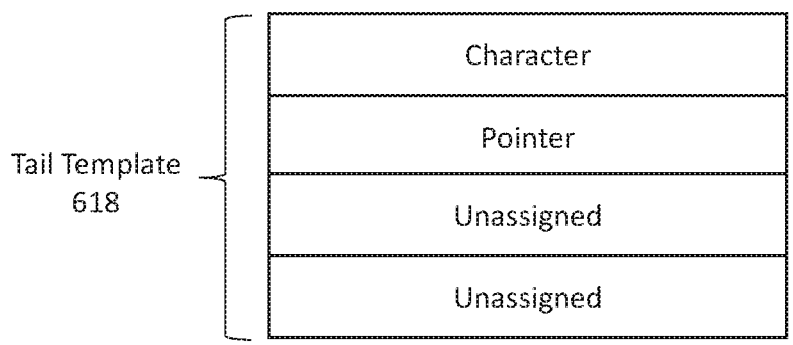
FIG. 6B illustrates an example tail template in accordance with one or more embodiments.

Referring to FIG. 6B, FIG. 6B illustrates an example tail template in accordance with one or more embodiments. As illustrated, a tail template 618 defines the memory layout for a tail 616 of a fused object. The tail template 618 specifies a set of types for memory slots within the tail 616 of a fused object.

As an example, a fused object is associated with a head template that is the same as the object template 508 (as illustrated in FIG. 5B). The object template 508 specifies the types long and pointer. Based on the object template 508 serving as the head template, a head 606 of the fused object includes a long variable and a pointer variable, as illustrated.

Further, the fused object is associated with the tail template 618 (as illustrated in FIG. 6B). The tail template 618 specifies the types character, pointer, unassigned, and unassigned. Based on the tail template 618, a tail 616 of the fused object includes a character variable and a pointer variable, as illustrated. According to the tail template 618, the tail 616 also includes two memory slots associated with the unassigned type.

Further, in this example, the memory size of the tail 616 is greater than the memory size corresponding to the types specified by the tail template 618. The memory size corresponding to the types specified by the tail template 618 is determined as follows. The tail template 618 specifies the types character, pointer, unassigned, and unassigned. The number of memory slots required for each type is determined. The character type may require one memory slot. The pointer type may require one memory slot. The unassigned type may require one memory slot. Therefore, a total of four memory slots correspond to the types specified by the tail template 618. Each memory slot may be 8-byte wide. Hence, the memory size corresponding to the types specified by the tail template 618 may be 8×4=32 bytes. Since the memory size of the tail 616 is greater than the memory size corresponding to the types specified by the tail template 618, a remainder of the tail 616 has memory slots whose types are not specified by the tail template 618. The remainder of the tail 616 is given the unassigned type. As illustrated, the remainder of the tail 616 includes two additional memory slots, both given the unassigned type.

In one or more embodiments, a tail template 618 specifies a set of types and a corresponding set of offsets. The offsets correspond to the memory slots within the tail of the fused object. As an example, a tail template may specify a type integer corresponding to the offset 0, a type unassigned corresponding to the offset 1, and a type character corresponding to the offset 2. The tail template indicates that a tail of a fused object should include a first memory slot associated with the type integer, a second memory slot associated with the type unassigned, and a third memory slot associated with the type character.

In one or more embodiments, a tail template 618 specifies a set of types without a corresponding set of offsets. The memory layout for the tail is determined based on a sequential layout of the set of types through the memory slots within the tail. As an example, a tail template may specify the types integer and character. The size of memory slots may be fixed based on the machine type. In a 32-bit machine, for example, the size of a memory slot is 4 bytes. The types integer and character each fit within one memory slot. Hence, the tail of a fused object should include a first memory slot associated with the type integer, and a second memory slot associated with the type character. As another example, a tail template may specify the types long and character. In a 32-bit machine, the type long may require two memory slots. Hence, the tail of a fused object should include two memory slots associated with the type long, and a third memory slot associated with the type character.

As another example, a tail template may specify the types integer and character. The size of memory slots may be adjusted based on the types assigned to the memory slots. The type integer may require 4 bytes. The type character may require 2 bytes. Hence, the tail of a fused object should include a first memory slot, having a size of 4 bytes, associated with the type integer. The tail should also include a second memory slot, having a size of 2 bytes, associated with the type character.

In one or more embodiments, a tail template 618 that is associated with a fused object is modifiable. A fused object may be associated with a particular tail template, and later be associated with a different tail template. Changing from being associated with the particular tail template to being associated with the different tail template may be referred to as a "tail template transition." A verification process may be executed prior to transitioning from the particular tail template to the different tail template, as further discussed below in Section 5, entitled "Verifying Whether a Transition, for a Fused Object, from a Current Tail Template to a New Tail Template Is Valid." Since the tail template 618 may be replaced and/or swapped with another tail template, the memory layout for the tail 616 is modifiable.

Figure 7A:
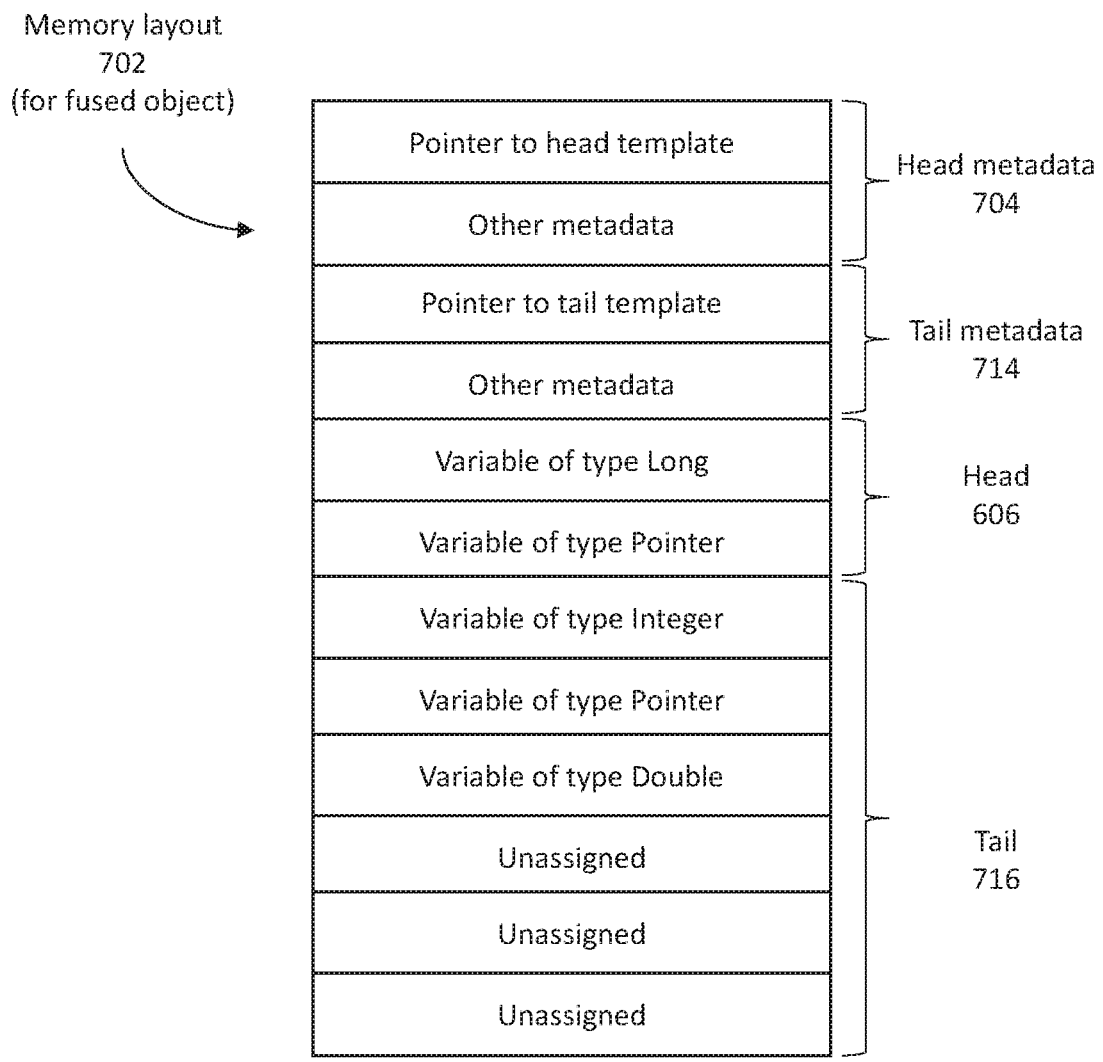
FIG. 7A illustrates an example memory layout for a fused object in accordance with one or more embodiments.
Figure 7B:
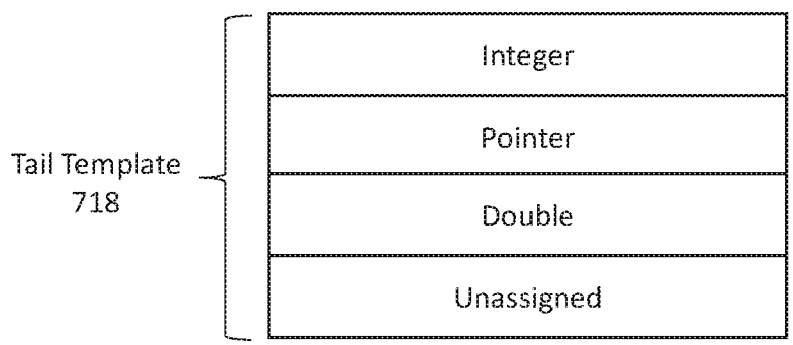
FIG. 7B illustrates an example tail template in accordance with one or more embodiments.

FIG. 7A illustrates an example memory layout for a fused object in accordance with one or more embodiments. FIG. 7B illustrates an example tail template in accordance with one or more embodiments. As an example, a fused object is modified from being associated with the tail template 618 (as illustrated in FIG. 6B) to being associated with the tail template 718 (as illustrated in FIG. 7B). The fused object is modified from having the memory layout 602 (as illustrated in FIG. 6A) to having the memory layout 702 (as illustrated in FIG. 7B).

As described above, the head template and the head 606 of the fused object are not modifiable. As such, the fused object continues to be associated with a head template that is the same as the object template 508 (as illustrated in FIG. 5B). The fused object continues to have the same head 606. The head 606 of the fused object includes a long variable and a pointer variable, as illustrated in FIG. 7A.

However, the tail template 618 and the tail 616 of the fused object are modifiable. Tail metadata 614 initially includes a pointer to the tail template 618. Tail metadata 714 is modified to include a pointer to the tail template 718. The tail template 718 specifies the types integer, pointer, double, and unassigned. Based on the tail template 718, the tail 716 of the fused object is modified to include an integer variable, a pointer variable, and a double variable, as illustrated. Based on the tail template 718, the tail 716 also includes one memory slot associated with the unassigned type. The remainder of the tail 716, whose type is not specified by the tail template 718, is given the unassigned type. As illustrated, the remainder of the tail 616 includes one additional memory slot with the unassigned type.

Figure 8:
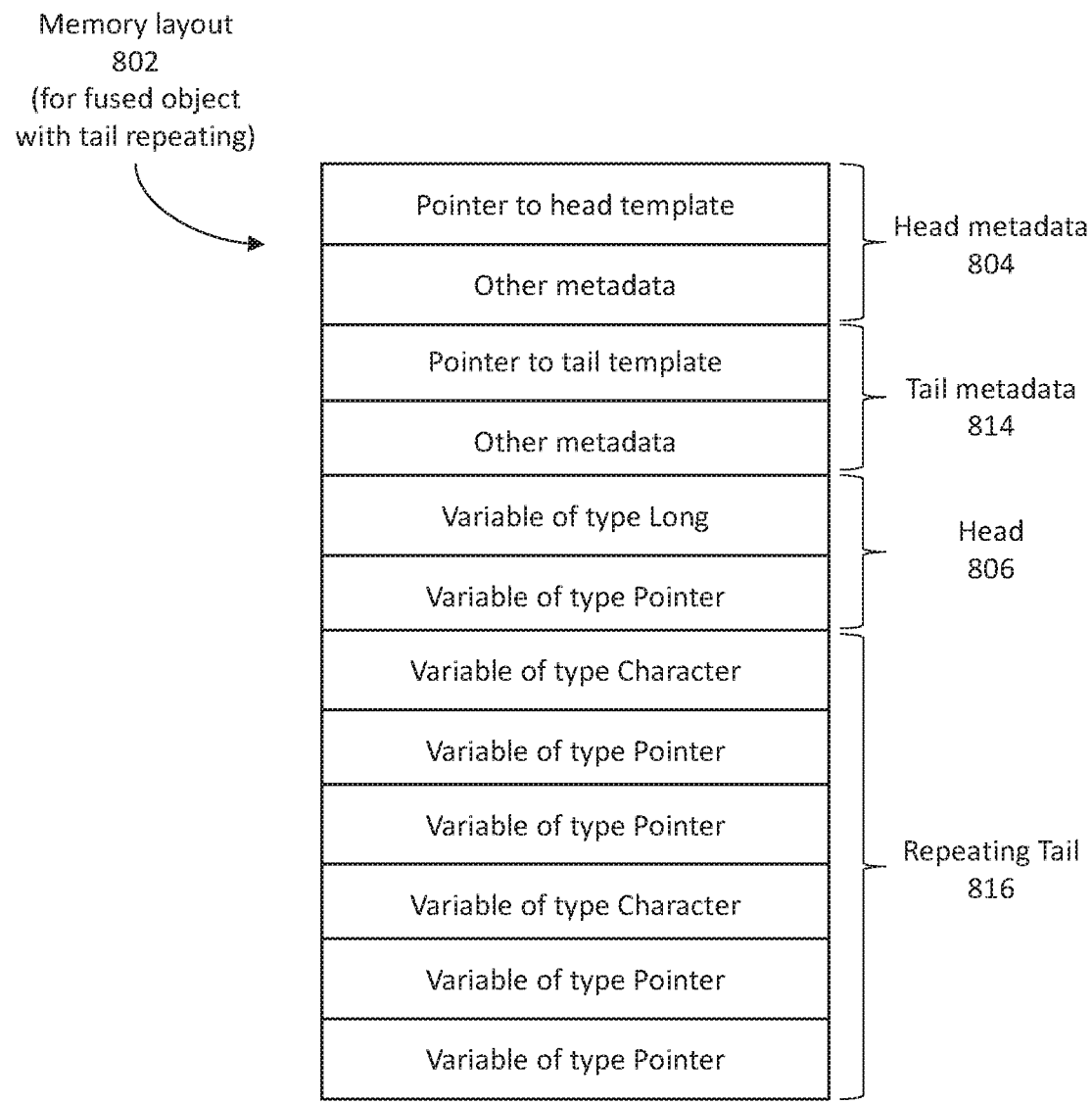
FIG. 8 illustrates an example memory layout for a fused object with a repeating tail in accordance with one or more embodiments.

FIG. 8 illustrates an example memory layout for a fused object with a repeating tail in accordance with one or more embodiments. As illustrated, a memory layout 802 for a fused object includes head metadata 804, tail metadata 814, a head 806, and a repeating tail 816.

In one or more embodiments, a repeating tail 816 is a tail of a fused object that includes repetition of the set of types specified by a tail template. The tail template is repeated to define successive regions of the memory layout for the tail of the fused object. Tail metadata 814 may include a variable indicating whether the fused object includes a repeating tail 816.

As an example, a fused object may be associated with a head template that is the same as the object template 508 (as illustrated in FIG. 5B). Head metadata 804 includes a pointer to the object template 508. Based on the object template 508, a head 806 of the fused object includes a long variable and a pointer variable, as illustrated in FIG. 8.

The fused object may be associated with a particular tail template that specifies the types character, pointer, and pointer. Tail metadata 814 includes a pointer to the particular tail template. Tail metadata 814 also includes a variable indicating that the fused object has a repeating tail 816.

The repeating tail 816 includes repetition of the set of types specified by the particular tail template. As illustrated, the repeating tail 816 includes character, pointer, pointer, character, pointer, and pointer. Hence the set of types (character, pointer, and pointer) specified by the particular tail template has been repeated twice.

In one or more embodiments, tail metadata 814 includes a size variable indicating a number of times that the tail template is repeated within the repeating tail 816. Additionally or alternatively, tail metadata 814 includes a size variable indicating a memory size of the repeating tail 816 and/or a memory size of the fused object.

Figure 9A:
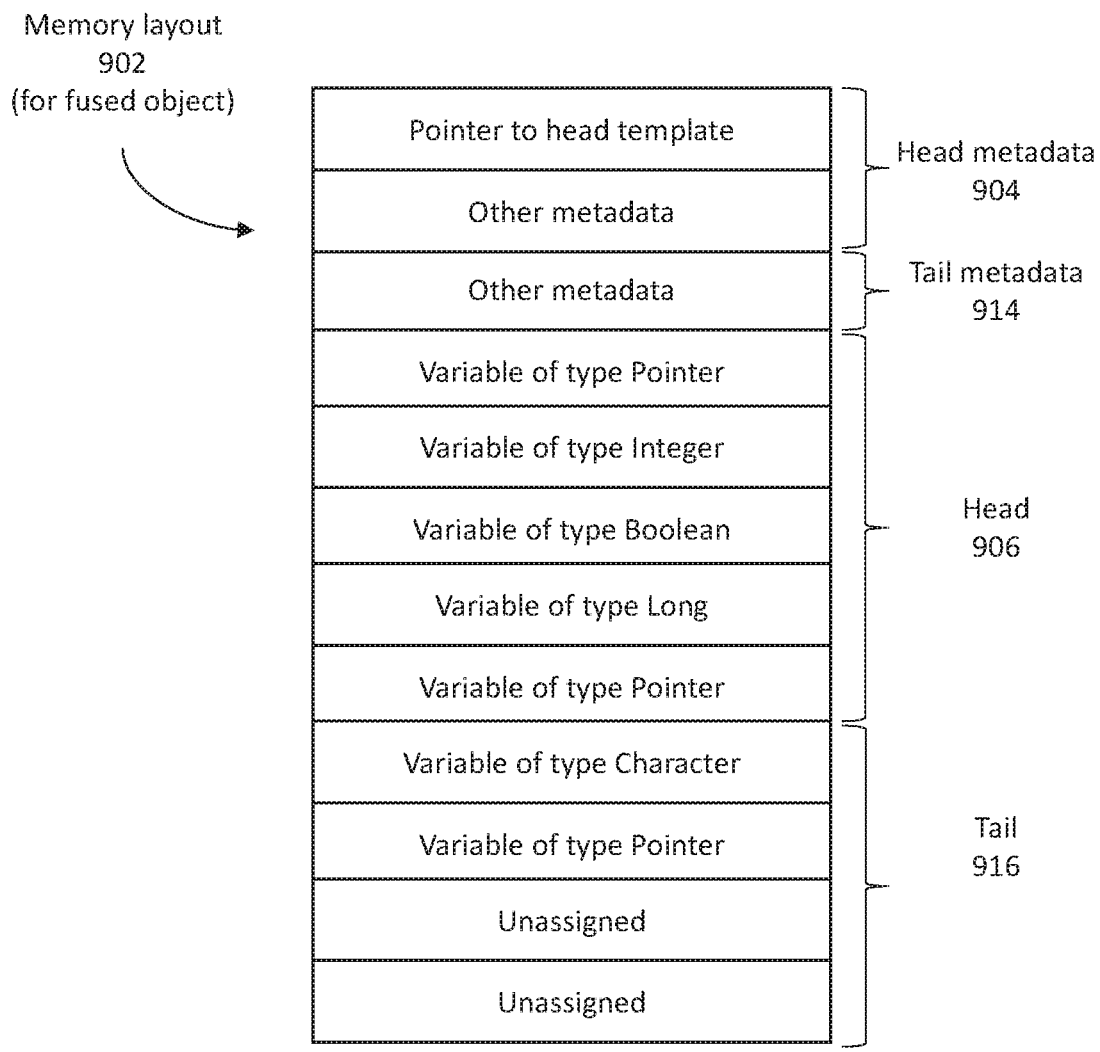
FIG. 9A illustrates an example memory layout for a fused object in accordance with one or more embodiments.
Figure 9B:
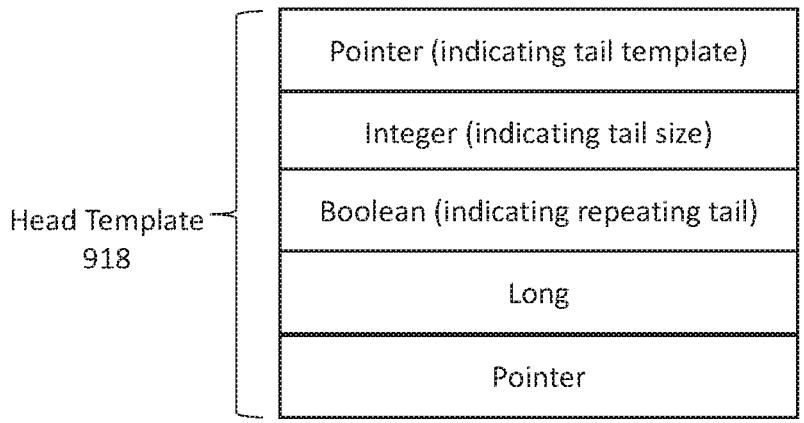
FIG. 9B illustrates an example head template in accordance with one or more embodiments.

As an alternative to the memory layout 602 illustrated in FIG. 6A, FIG. 9A illustrates an example memory layout for a fused object in accordance with one or more embodiments. FIG. 9B illustrates an example head template in accordance with one or more embodiments.

In FIG. 6A, tail metadata 614 may include the following pieces of information relevant to the tail 616 of the fused object: (a) a pointer to a tail template 618; (b) a size variable indicating a memory size of the tail 616 and/or a memory size of the fused object; and (c) a variable indicating whether the tail 616 is repeating or not.

In contrast, in FIG. 9A, tail metadata 914 does not necessarily include the tail information that is included in tail metadata 614. A head 906 of the fused object includes the tail information that is included in tail metadata 614.

The memory layout for the head 906 is defined by the head template 918. As illustrated, for example, the head template 918 specifies the types pointer, integer, boolean, long, and pointer. The first three types (pointer, integer, and boolean) correspond respectively to the tail information: (a) a pointer to the tail template for the fused object; (b) a size variable indicating a memory size of the tail 916 and/or a memory size of the fused object; and (c) a variable indicating whether the tail 916 is repeating or not. Alternatively, variables of types different than those illustrated in FIG. 9B may be used to indicate the tail information. The last two types (long and pointer) correspond to the members of the head 906.

Based on the head template 918, the head 906 includes a variable of type pointer, which points to a tail template for the fused object. The head 906 includes a variable of type integer, which indicates a memory size of the tail 916 and/or a memory size of the fused object. The head 906 includes a variable of type boolean, which indicates whether the tail 916 of the fused object is repeating or not. Additionally, the head 906 includes a long variable and a pointer variable.

The tail template, as indicated by a pointer in the head 906, defines the tail 916 of the fused object. In this example, the tail template indicates the types character, pointer, unassigned, and unassigned. Based on the tail template, the tail 916 includes the types character, pointer, unassigned, and unassigned.

Figure 10:
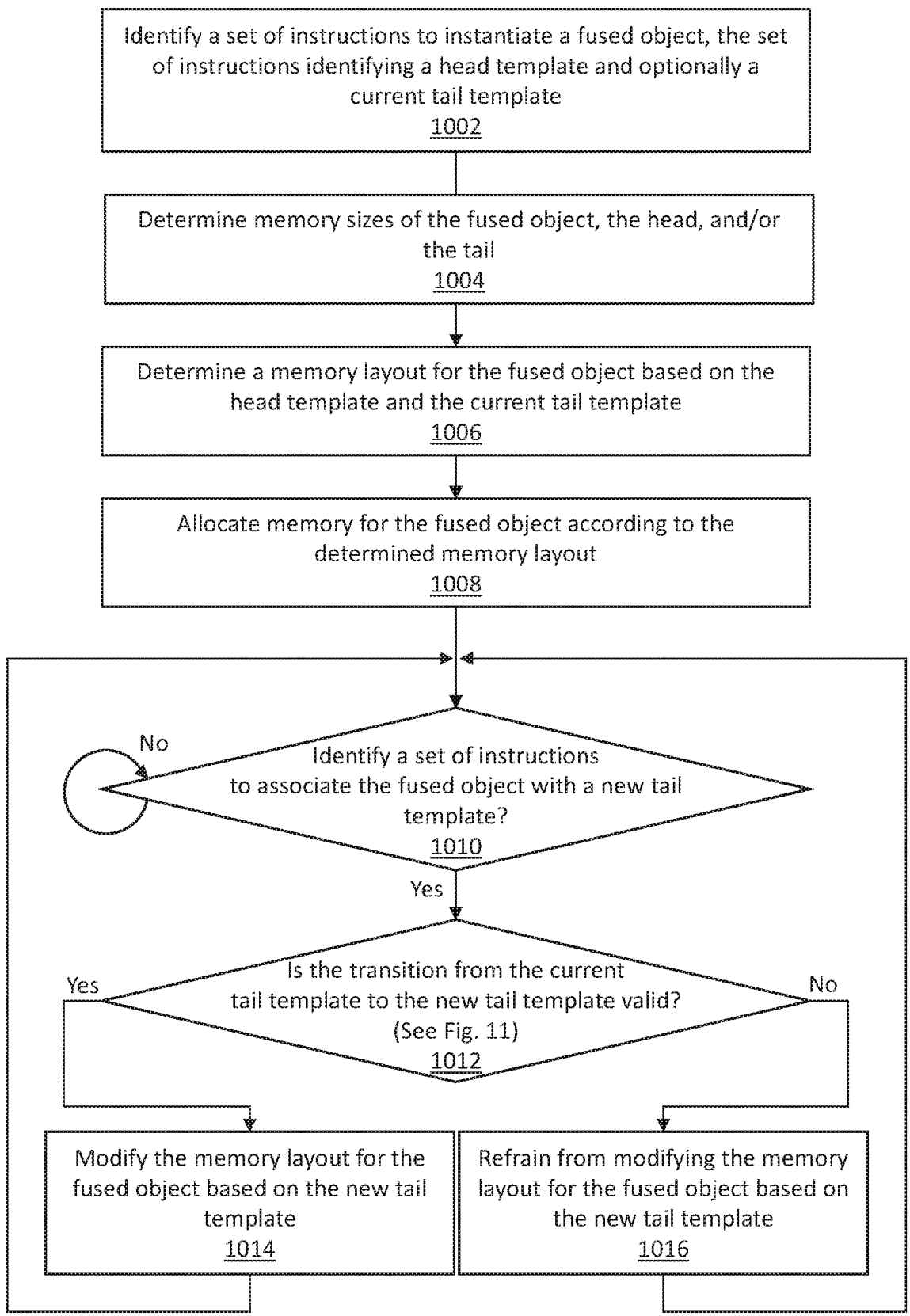
FIG. 10 illustrates an example set of operations for determining a memory layout for a fused object in accordance with one or more embodiments.

5. Verifying Whether a Transition, for a Fused Object, from A Current Tail Template to a New Tail Template is Valid FIG. 10 illustrates an example set of operations for determining a memory layout for a fused object in accordance with one or more embodiments. One or more operations illustrated in FIG. 10 may be modified, rearranged, or omitted all together. Accordingly, the particular sequence of operations illustrated in FIG. 10 should not be construed as limiting the scope of one or more embodiments.

The operations illustrated in FIG. 10 may be executed by a compiler and/or a runtime environment. The operations illustrated in FIG. 10 may be executed during a compilation or runtime for a set of code.

One or more embodiments include a set of one or more instructions to instantiate a fused object, the set of instructions identifying a head template and optionally a current tail template (Operation 1002). A set of instructions to instantiate a fused object is identified in a set of code, such as source code, bytecode, and/or machine code.

The set of instructions directly or indirectly identifies a head template for the fused object. The set of instructions may directly identify the head template by specifying a pointer to the head template, or by specifying a name or other identifier of the head template. Alternatively, the set of instructions may indirectly identify the head template by specifying a class for the head of the fused object. The class specifies a set of members, such as instance variables. The head template is determined as including the set of members specified by the class.

The set of instructions may but does not necessarily identify a current tail template for the fused object. The set of instructions may identify the current tail template by specifying a pointer, name, and/or other identifier associated with the current tail template.

One or more embodiments include determining memory sizes of the fused object, the head, and/or the tail (Operation 1004).

In an embodiment, the set of instructions identified at Operation 1002 specifies the memory size of the head, the memory size of the tail, and/or the memory size of the fused object. The memory size of the head metadata and/or the tail metadata may also be known based on the set of instructions identified at Operation 1002 and/or other instructions or configurations.

If the memory size of the head is not specified, then the memory size of the head may be determined based on the types specified by the head template. The memory size of the head may be the same as the memory size corresponding to the types specified by the head template.

In an embodiment, the memory size of each memory slot is fixed by the machine type. In a 32-bit machine, for example, each memory slot is 4-byte wide. In a 64-bit machine, each memory slot is 8-byte wide. To determine the memory size corresponding to the types specified by the head template, first, the number of memory slots occupied by the types specified by the head template is determined. Then, the number of memory slots occupied is multiplied by the memory size of each memory slot. As an example, a head template may specify the types integer and character. For a 32-bit machine, the types integer and character may each fit within one memory slot. Hence, the total number of memory slots occupied by the types specified by the head template is two. Two memory slots is equivalent to 8 bytes. Hence, the memory size corresponding to the types specified by the head is determined to be 8 bytes. The head is determined to be 8 bytes.

In an embodiment, the memory size of each memory slot is adjusted based on the type assigned to the memory slot. To determine the memory size corresponding to the types specified by the head template, the memory size required for each type within the head template is determined. As an example, a head template may specify the types integer and character. The type integer may require 4 bytes. The type character may require 2 bytes. The head may include a first memory slot of 4 bytes and a second memory slot of 2 bytes. Therefore, the memory size corresponding to the types specified by the head template, and hence the memory size of the head, is 6 bytes.

In other embodiments, memory slots may be padded, aligned to certain boundaries, and/or reordered. Based on the type to be given to each memory slot is determined, and the size of each memory slot, the memory size of the head is determined.

If the memory size of the tail is not specified, then the memory size of the tail may be determined based on the types specified by the current tail template. The memory size of the tail may be assumed to be equal to the memory size corresponding to the types specified by the current tail template. Determining the memory size corresponding to the types specified by the current tail template is similar to determining the memory size corresponding to the types specified by the head template, as described above.

However, the set of instructions identified at 1002 may specify a memory size of the tail. The specified memory size for the tail may be equal to or larger than the memory size corresponding to the types specified by the current tail template.

In an embodiment, a memory size of a particular component (such as, head, tail, or fused object) may be determined based on the memory sizes of other components. The memory size of the fused object is equal to the sum of the memory size of the head, the memory size of the tail, the memory size of the head metadata, and the memory size of the tail metadata. If all but one of the above memory sizes are specified and/or determined, then the remaining memory size may be calculated. As an example, a memory size of a fused object, and the memory sizes of the head metadata and the tail metadata for the fused object, may be specified by a set of instructions and/or configurations. A head template and a tail template may be specified for the fused object. A memory size of the head may be determined based on the memory size corresponding to the types specified by the head template. Then, the memory size of the tail may be calculated based on the memory size of the fused object, the memory size of the head metadata, the memory size of the tail metadata, and the memory size of the head. Specifically, the memory size of the tail is equal to the memory size of the fused object minus the memory size of the head metadata, the memory size of the tail metadata, and the memory size of the head. The calculated memory size of the tail may be equal to or larger than the memory size corresponding to the types specified by the tail template.

One or more embodiments include determining a memory layout for the fused object based on the head template and the current tail template (if any) (Operation 1006).

The memory layout for the head of the fused object is determined based on the head template. In an embodiment, the head template specifies a set of types and a corresponding set of offsets. The offsets correspond to memory slots within the head of the fused object. As an example, a head template may specify a type integer corresponding to the offset 0, and a type character corresponding to the offset 1. Based on the head template, the head of the fused object includes a first memory slot associated with the type integer, and a second memory slot associated with the type character. In another embodiment, the head template specifies a set of types without a corresponding set of offsets. The memory layout for the head is determined based on a sequential layout of the set of types through the memory slots within the head. As an example, a head template may specify the types integer and character. The types integer and character may each fit within one memory slot. Hence, the head of the fused object includes a first memory slot associated with the type integer, and a second memory slot associated with the type character.

If the set of instructions specify a current tail template, then the memory layout for the tail of the fused object is determined based on the current tail template Similar to the head template, the current tail template specifies a set of types and a corresponding set of offsets in an embodiment. The offsets correspond to memory slots within the tail of the fused object. In another embodiment, the current tail template specifies a set of types without a corresponding set of offsets. The memory layout for the tail is determined based on a sequential layout of the set of types through the memory slots within the tail.

A memory size of the tail, determined at Operation 1004, is compared with a memory size corresponding to the types specified by the current tail template. If the memory size of the tail is greater than the memory size corresponding to the types specified by the current tail template, then the remaining memory slots of the tail, whose types are not specified by the current tail template, are given the unassigned type. Alternatively, if the memory size of the tail is greater than the memory size corresponding to the types specified by the current tail template, then the remaining memory (not occupied by the types specified by the current tail template) may be assumed to be one memory slot. The one memory slot may be given the unassigned type.

If the set of instructions do not specify any tail template, then all memory slots within the tail of the fused object are given the unassigned type. Alternatively, if the set of instructions do not specify any tail template, then the tail may be assumed to have one memory slot, given the unassigned type.

One or more embodiments include allocating memory for the fused object according to the memory layout determined at Operation 1006 (Operation 1008). The amount of memory allocated for the fused object is equal to the memory size of the fused object, determined at Operation 1004. Values stored in the memory allocated for the fused object are written, read, and/or otherwise interpreted in accordance with the memory layout determined at Operation 1006.

As an example, a memory layout for a fused object may indicate a first memory slot within the tail is of type integer, and a second memory slot within the tail is of type character.

Variables of type integer may be stored in signed two's complement form. For a 16-bit machine, if the decimal value to be written into the integer variable is "1," then the first memory slot within the tail would be written with "0000 0000 0000 0001."

Variables of type character may be represented in Unicode. For a 16-bit machine, if the character to be written into the character variable is "$", then the second memory slot within the tail would be written with "0000 0000 0010 0100" (the Unicode for "$").

One or more embodiments include identifying a set of one or more instructions to associate the fused object with a new tail template (Operation 1010). The set of instructions to associate the fused object with a new tail template is identified in a set of code, such as source code, bytecode, and/or machine code. The set of instructions may identify the new tail template by specifying a pointer, name, and/or other identifier associated with the new tail template.

One or more embodiments include determining whether the transition from the current tail template to the new tail template is valid (Operation 1012). The validity of the transition from the current tail template to the new tail template is determined by analyzing the type transitions per memory slot. The types assigned to each respective memory slot within the tail of the fused object, as defined by the current tail template, are identified. The types that would be assigned to each respective memory slot within the tail of the fused object, as defined by the new tail template, are identified. Whether the transition, for each memory slot, from a particular type as defined by the current tail template to another type as defined by the new tail template constitutes a type-compatible transition is determined. If the type transition for each memory slot is type-compatible, then the transition from the current tail template to the new tail template is valid. Detailed examples for determining whether the transition from the current tail template to the new tail template is valid are included below with reference to FIG. 11.

If the transition from the current tail template to the new tail template is valid, then one or more embodiments include modifying the memory layout for the fused object based on the new tail template (Operation 1014).

In an embodiment, tail metadata of the fused object initially includes a pointer to the current tail template. The tail metadata is modified to replace the pointer to the current tail template with a pointer to the new tail template. In another embodiment, the head of the fused object initially includes a pointer to the current tail template. The head is modified to replace the pointer to the current tail template with a pointer to the new tail template.

Additionally, the memory layout for the tail of the fused object is modified according to the new tail template. A memory layout for the tail is determined based on the new tail template, using similar methods as described above with reference to Operation 1006. Values stored in the memory allocated for the fused object are written, read, and/or otherwise interpreted in accordance with the memory layout determined based on the new tail template.

As an example, a memory layout for the fused object, based on a current tail template, may indicate a first memory slot within the tail is of type integer. The first memory slot may store the value, "0000 0000 0010 0100." When the value stored in the first memory slot is read as an integer, the value is interpreted as the decimal value "36."

Subsequently, a memory layout for the fused object may be modified based on a new tail template. The modified memory layout may indicate that the first memory slot within the tail is of type character. There is no change to the value stored in the first memory slot, which is, "0000 0000 0010 0100." When the value stored in the first memory slot is read as a character variable, the value is interpreted as the character "$".

If the transition from the current tail template to the new tail template is not valid, then one or more embodiments include refraining from modifying the memory layout for the fused object based on the new tail template (Operation 1016). The tail metadata and/or head of the fused object continues to include a pointer to the current tail template. The memory layout for the tail of the fused object continues to be defined by the current tail template. An error message indicating the transition from the current tail template to the new tail template is invalid may be generated.

Figure 11:
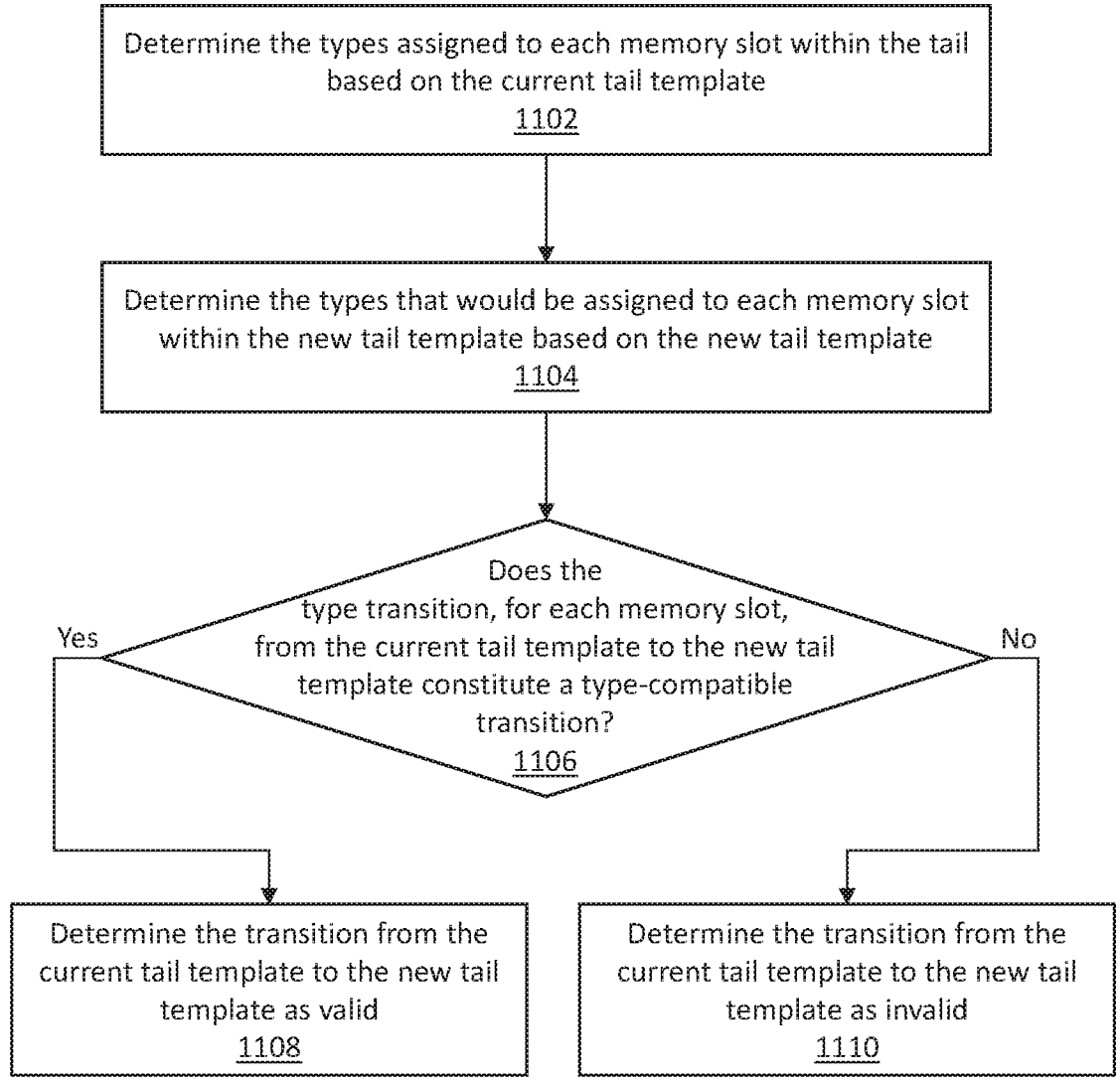
FIG. 11 illustrates an example set of operations for determining whether a transition from a current tail template to a new tail template is valid in accordance with one or more embodiments.

FIG. 11 illustrates an example set of operations for determining whether a transition from a current tail template to a new tail template is valid in accordance with one or more embodiments. One or more operations illustrated in FIG. 11 may be modified, rearranged, or omitted all together. Accordingly, the particular sequence of operations illustrated in FIG. 11 should not be construed as limiting the scope of one or more embodiments.

One or more embodiments include determining the types assigned to each memory slot within the tail of the fused object based on the current tail template (Operation 1102).

In an embodiment, the current tail template specifies a set of types and a corresponding set of offsets. The offsets correspond to the memory slots within the tail of the fused object. The type corresponding to a particular offset as specified by the current tail template is the type assigned to the memory slot associated with the particular offset.

As an example, a current tail template may specify a type integer corresponding to the offset 0, a type unassigned corresponding to the offset 1, and a type character corresponding to the offset 2. Based on the current tail template, a first memory slot within the tail may be associated with the type integer, a second memory slot may be associated with the type unassigned, and a third memory slot may be associated with the type character.

A current tail template may specify a set of types and a corresponding set of offsets. However, the current tail template does not necessarily specify a type for a consecutive range of offsets. For example, a particular type may require more than one memory slot. The current tail template may specify that a particular offset corresponds to the particular type, but does not specify that the following one or more offsets also correspond to the particular type. Since the particular type requires more than one memory slot, the following offsets are assumed to also correspond to the particular type.

As another example, a current tail template may specify a type long corresponding to the offset 0, and a type character corresponding to the offset 2. The type long may require two memory slots. The current tail template does not specify any type for the offset 1. Based on the current tail template, both a first memory slot and a second memory slot within the tail may be associated with the type long. A third memory slot may be associated with the type character.

In another embodiment, the current tail template specifies a set of types without a corresponding set of offsets. The memory layout for the tail is determined based on a sequential layout of the set of types through the memory slots within the tail.

As an example, a tail template may specify the types integer and character. In a 32-bit machine, the memory size of memory slots may be fixed to 4 bytes. The types integer and character each fit within one memory slot. Hence, a first memory slot within the tail may be associated with the type integer, and a second memory slot may be associated with the type character.

As another example, a tail template may specify the types long and character. In a 32-bit machine, the memory size of memory slots may be fixed to 4 bytes. The type long may require two memory slots. Hence, a first memory slot and second memory slot within the tail may be associated with the type long. A third memory slot may be associated with the type character.

As another example, a tail template may specify the types integer and character. The memory size of memory slots may be adjusted based on the types assigned to the memory slots. The type integer requires 4 bytes. The type character requires 2 bytes. Hence, a first memory slot of 4 bytes may be associated with the type integer. A second memory slot of 2 bytes may be associated with the type character.

As another example, a tail template may specify the types integer and character. The memory size of each memory slot may be one byte. The type integer requires 4 bytes. The type character requires 2 bytes. Hence, the first four memory slots within the tail may be associated with the type integer. The next two memory slots within the tail may be associated with the type character.

One or more embodiments include determining the types that would be assigned to each memory slot within the tail of the fused object based on the new tail template (Operation 1104). The types that would be assigned to each memory slot are determined based on the new tail template, using similar methods as described above with reference to Operation 1102.

In an embodiment, the new tail template specifies a set of types and a corresponding set of offsets. The offsets correspond to the memory slots within the tail of the fused object. The offsets specified in the new tail template may be the same as or different from the offsets specified in the current tail template. The offsets specified in the new tail template may span a range larger than that associated with the offsets specified in the current tail template.

As an example, a current tail template may specify a type long corresponding to the offset 0, and a type character corresponding to the offset 2. A new tail template may specify a type integer corresponding to the offset 0, a type short corresponding to the offset 1, a type character corresponding to the offset 2, and a type pointer corresponding to the offset 3. In this example, the offsets specified by the new tail template include the offsets specified by the current tail template (namely, offset 0 and offset 2). The new tail template also includes additional offsets (namely, namely offset 1 and offset 3). The range of the offsets specified by the current tail template is from 0 to 2. The range of the offsets specified by the new tail template is from 0 to 3, which is greater than the range of the offsets specified by the current tail template.

One or more embodiments include determining whether the type transition, for each memory slot, from the current tail template to the new tail template constitutes a type-compatible transition (Operation 1106). A first type assigned to a particular memory slot based on the current tail template, determined at Operation 1102, is identified. A second type that would be assigned to the same memory slot based on the new tail template, determined at Operation 1104, is also identified. The transition from the first type to the second type, for the particular memory slot, may be referred to as a "type transition" for the particular memory slot.

Various methods may be used to determine whether a type transition for a particular memory slot constitutes a type-compatible transition, as described below.

In an embodiment, typestate analysis is used to determine whether a type transition for a particular memory slot constitutes a type-compatible transition. Each type is mapped to a typestate. Hence, a type transition for the particular memory slot is mapped to a typestate transition. A state machine is used to determine whether the typestate transition is valid. A type-compatible transition is one that corresponds to a valid typestate transition, as indicated by the state machine.

Figure 12:
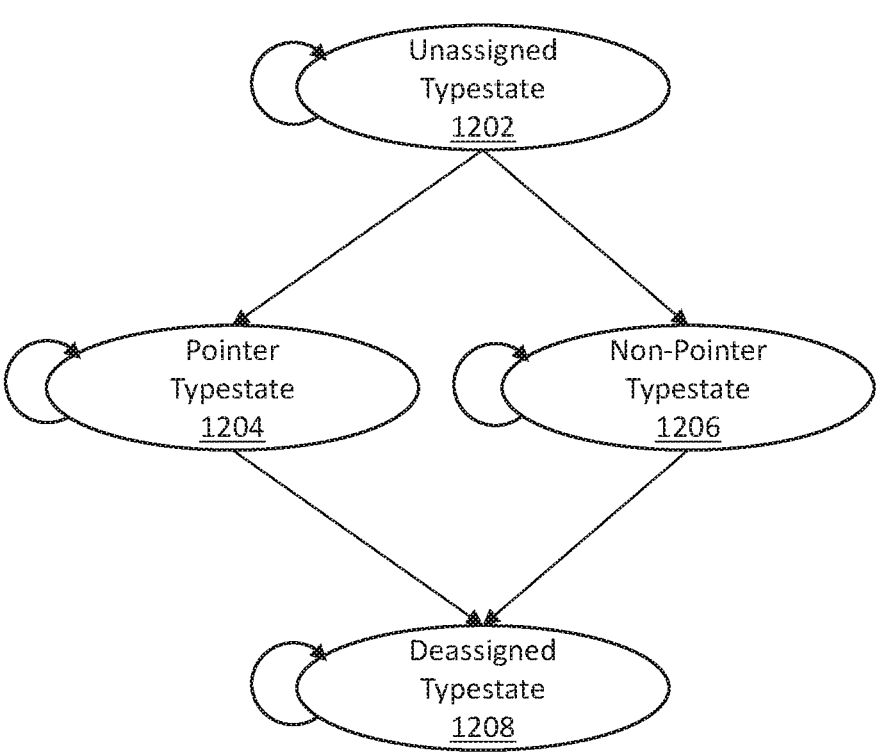
FIG. 12 illustrates an example state machine for valid typestate transitions in accordance with one or more embodiments.

FIG. 12 illustrates an example state machine for valid typestate transitions in accordance with one or more embodiments. As illustrated, there are four typestates: the unassigned typestate, the pointer typestate, the non-pointer typestate, and the deassigned typestate.

The unassigned typestate is mapped to the unassigned type. The pointer typestate is mapped to the pointer type. The non-pointer typestate is mapped to any type that is not the pointer type, the unassigned type, or the deassigned type. The non-pointer typestate is mapped to, for example, the integer type, the double type, the long type, the character type, and the boolean type. The deassigned typestate is mapped to the deassigned type.

The state machine defines valid sequences of typestate transitions. Each arrow in FIG. 12 represents a valid typestate transition. As illustrated, the following are valid typestate transitions:

(a) unassigned typestate→unassigned typestate;
(b) unassigned typestate→pointer typestate;
(c) unassigned typestate→non-pointer typestate;
(d) pointer typestate→pointer typestate;
(e) pointer typestate→deassigned typestate;
(f) non-pointer typestate→non-pointer typestate; and
(g) non-pointer typestate→deassigned typestate.

The following are examples of invalid typestate transitions:

(a) pointer typestate→non-pointer typestate;
(b) non-pointer typestate→pointer typestate;
(c) pointer typestate→unassigned typestate;
(d) non-pointer typestate→unassigned typestate;
(e) deassigned typestate→pointer typestate; and
(f) deassigned typestate→non-pointer typestate.

Based on the example state machine, a memory slot can never be transitioned from being associated with a pointer type to being associated with a non-pointer type. A memory slot can never be transitioned from being associated with a non-pointer type to being associated with a pointer type. Pointers are managed differently on heap memory. As an example, a particular map may be maintained to identify all pointers on the heap memory. As another example, a garbage collection process may trace through all pointers of used objects. If a memory slot were to transition from being associated with a pointer type to being associated with a non-pointer type, then there is a risk that an operation would still treat that memory slot as a pointer type. Meanwhile, a value that is not intended to be a pointer may have already been written into that memory slot. Hence, the operation may reference an invalid memory location based on the value in that memory slot. Referencing an invalid memory location may cause security issues as well as other errors.

The restrictions enforced by the state machine ensure that referential integrity is maintained on heap memory.

The following is an example for determining whether a type transition is type-compatible based on the example state machine of FIG. 12. A current tail template may indicate the types long and pointer. In a 64-bit machine, the first memory slot within the tail may be assigned with type long and the second memory slot may be assigned with type pointer. A new tail template may indicate the types integer and pointer. Based on the new tail template, the first memory slot within the tail would be assigned with type integer and the second memory slot would be assigned with type pointer.

For the first memory slot, the type transition is long type→integer type. The type transition is mapped to the typestate transition non-pointer typestate→non-pointer typestate. Based on the example state machine of FIG. 12, the typestate transition is valid.

For the second memory slot, the type transition is pointer type→pointer type. The type transition is mapped to the typestate transition pointer typestate→pointer typestate. Based on the example state machine of FIG. 12, the typestate transition is valid.

Referring to the same example but using a 32-bit machine, a different result is obtained. A current tail template may indicate the types long and pointer. In a 32-bit machine, the first memory slot and the second memory slot within the tail may be assigned with type long. The third memory slot may be assigned with type pointer. A new tail template may indicate the types integer and pointer. Based on the new tail template, the first memory slot within the tail would be assigned with type integer and the second memory slot would be assigned with type pointer.

For the first memory slot, the type transition is long type→integer type. The type transition is mapped to the typestate transition non-pointer typestate→non-pointer typestate. Based on the example state machine of FIG. 12, the typestate transition is valid. The typestate transition is valid, even though the type for the first memory slot has changed.

For the second memory slot, the type transition is long type→pointer type. The type transition is mapped to the typestate transition non-pointer typestate→pointer typestate. Based on the example state machine of FIG. 12, the typestate transition is invalid.

For the third memory slot, the type transition is pointer type→unassigned type. The type transition is mapped to the typestate transition pointer typestate→unassigned typestate. Based on the example state machine of FIG. 12, the typestate transition is invalid.

In other embodiments, different state machines of valid typestate transitions may be used. A state machine may indicate that it is possible to transition from an unconstrained pointer typestate to a constrained pointer typestate, but not vice versa. The state machine may indicate that it is possible to make transitions that add constraints to a pointer type, while restricting transitions that remove constraints from a pointer type.

The following is an example of an unconstrained pointer type. A tail template may include a pointer type along with a particular type of the object that is being referenced by the pointer. The tail template may indicate that the type of the object referenced by the pointer is Object. The type Object may have no superclasses. Hence, there are no constraints on the pointer type specified by the tail template.

The following are examples of constrained pointer types. A tail template may include a pointer type and indicate that the type of the object referenced by the pointer is String. The type String may have no sub-classes. Hence, the pointer type specified by the tail template is specifically constrained to referencing an object of type String.

As another example, a tail template may include a pointer type and indicate that the type of the object referenced by the pointer is Number. The type Number may have various sub-classes, such as BigDecimal. Hence, the pointer type specified by the tail template is constrained to referencing an object of type Number or the sub-classes of Number.

Based on the above examples of pointer types, a state machine may indicate that transitioning from the pointer type that references an Object to any other pointer type is valid. The state machine may indicate that transitioning from the pointer type that references a String to any pointer type that does not reference a String is invalid. The state machine may indicate that transitioning from the pointer type that references a Number to a pointer type that references a Number or a pointer type that references a BigDecimal is valid. The state machine may indicate that transitioning from the pointer type that references a BigDecimal to a pointer type that references a Number is invalid.

In an embodiment, a state machine may indicate that it is possible to transition from a non-pointer typestate to a non-pointer typestate only if the content of the memory slot is not interpreted differently due to the type transition.

As an example, values of type byte may be stored as signed two's complements. Values of type short may be stored as signed two's complements. A memory slot may store the value "0000 0000 0000 0001." If the memory slot is associated with the type byte, the decimal value of the memory slot is "1." If the memory slot is associated with the type short, the decimal value of the memory slot is also "1." A transition from the type byte to the type short does not affect the contents of the memory slot. A state machine may indicate that the transition is valid.

As another example, values of type short are stored as signed two's complements. Values of type character are stored as Unicode. A memory slot may store the value "0000 0000 0010 0100." If the memory slot is associated with the type short, the decimal value of the memory slot is "36." If the memory slot is associated with the type character, the character stored in the memory slot is "$." A transition from the type short to the type character does affect the contents of the memory slot. A state machine may indicate that the transition is invalid.

In an embodiment, type transitions may be analyzed without the use of typestates. As an example, type-compatible transitions may be defined as: (a) a transition from the unassigned type to any other type, or (b) a transition from a particular type to itself. All other type transitions may be determined as invalid. Accordingly, a memory slot may initially be assigned with any type. Once a type (other than the unassigned type) has been assigned to the memory slot, the type cannot be changed.

As an example, a current tail template may specify the type integer. A tail of a fused object may have two memory slots. The first memory slot may be associated with the type integer based on the current tail template. The second memory slot does not have a type specified by the current tail template. The second memory slot may be associated with the type unassigned.

A new tail template may specify the types integer and pointer. Based on the new tail template, the first memory slot would be associated with the type integer. The second memory slot would be associated with the type pointer.

For the first memory slot, the type transition is integer type→integer type. The type transition is a particular type to itself. Hence the type transition is valid.

For the first memory slot, the type transition is unassigned type→pointer type. The type transition is the unassigned type to any other type. Hence the type transition is valid.

In an embodiment, the system determines whether a type specified by the current tail template and a type specified by the new tail template, for the same memory slot, are the same type. If the types are the same, then the transition is determined as valid without further analysis. There is no need to perform typestate analysis for the corresponding memory slot. If the types are not the same, then further analysis (such as the examples described herein) may be performed. In other embodiments, regardless of whether a type specified by the current tail template and a type specified by the new tail template, for the same memory slot, are the same, typestate analysis and/or other analysis may be performed for the memory slot. As an example, a type specified by a current tail template for a particular memory slot may be integer. A type specified by a new tail template for the particular memory slot may also be integer. The type transition for the particular memory slot may be mapped to the typestate transition non-pointer typestate→non-pointer typestate. Based on a state machine, the typestate transition may be determined as valid. Therefore, the type transition for the particular memory slot may be determined as valid.

In an embodiment, determining whether a type transition is type-compatible includes determining whether the type size of each type specified in the new tail template is equal to or less than the type size of each respective type specified in the current tail template. Comparing the type sizes associated with the new tail template with the type sizes associated with the current tail template may be necessary in a machine where the size of each memory slot is adjusted based on the type assigned to the memory slot.

As an example, a current tail template may specify the types integer and long. The integer type requires 4 bytes. The long type requires 8 bytes. Based on the current tail template, a tail of a fused object may have a particular memory layout. The particular memory layout may include a first memory slot with a size of 4 bytes (assigned to integer). The particular memory layout may include a second memory slot with a size of 8 bytes (assigned to long). A new tail template may specify the types character and long. The character type requires 2 bytes. The character type of the new tail template corresponds to the integer type of the current tail template. The size of the character type is less than the size of the integer type. The long type of the new tail template corresponds to the long type of the current tail template. There is no change in the type size. Therefore, the type size of each type specified in the new tail template is equal to or less than the type size of each respective type specified in the current tail template. The transition from the current tail template to the new tail template is valid.

As another example, a current tail template may specify the types integer and double. The integer type requires 4 bytes. The double type requires 8 bytes. Based on the current tail template, a tail of a fused object may have a particular memory layout. The particular memory layout may include a first memory slot with a size of 4 bytes (assigned to integer). The particular memory layout may include a second memory slot with a size of 8 bytes (assigned to double). A new tail template may specify the types long and double. The long type of the new tail template corresponds to the integer type of the current tail template. The size of the long type is greater than the size of the integer type. Therefore, the type size of each type specified in the new tail template is not equal to or less than the type size of each respective type specified in the current tail template. The transition from the current tail template to the new tail template is not valid.

In one or more embodiments, a pre-verification process is performed. The pre-verification process may be performed at the time that the new tail template is generated. After identifying a set of instructions to associate a particular fused object with the new tail template, the pre-verification results may be accessed to verify that transitioning the fused object to the new tail template is valid.

As an example, a first tail template may be generated. Subsequently, a second tail template may be generated based on the first tail template using valid type transitions. The second tail template is successfully generated only if the type transitions, for each memory slot, are valid. The second tail template is then associated with a flag indicating that the second tail template was generated based on the first tail template using valid type transitions.

Continuing the example, a fused object may initially be associated with the first tail template. An instruction to associate the fused object with the second tail template may be identified. Verifying that the transition from the first tail template to the second tail template is valid entails verifying that the second tail template was generated based on the first tail template using valid type transitions. Whether the second tail template is associated with a flag indicating that the second tail template was generated based on the first tail template using valid type transitions is determined. If the second tail template is associated with such a flag, then the transition from the first tail template to the second tail template is determined to be valid.

If the type transition, for each memory slot, constitutes a type-compatible transition, then one or more embodiments include determining that the transition from the current tail template to the new tail template is valid (Operation 1108). The type transition for each memory slot is verified as described above with reference to Operation 1106. If all type transitions are type-compatible, then the transition from the current tail template to the new tail template is valid.

If the type transition, for any memory slot, does not constitute a type-compatible transition, then one or more embodiments include determining that the transition from the current tail template to the new tail template is invalid (Operation 1110). If a type transition for any memory slot is invalid, then the transition from the current tail template to the new tail template is invalid. In one embodiment, whether the type transition for each memory slot is type-compatible may be determined as described above with reference to Operation 1106. Alternatively, as soon as the type transition for a single memory slot is determined to be not type-compatible, there is no need to continue examining the type transitions for the remaining memory slots. The transition from the current tail template to the new tail template may be determined as invalid on the basis of a single invalid type transition.

6. Generating a Fused Object with a Repeating Tail

Figure 13:
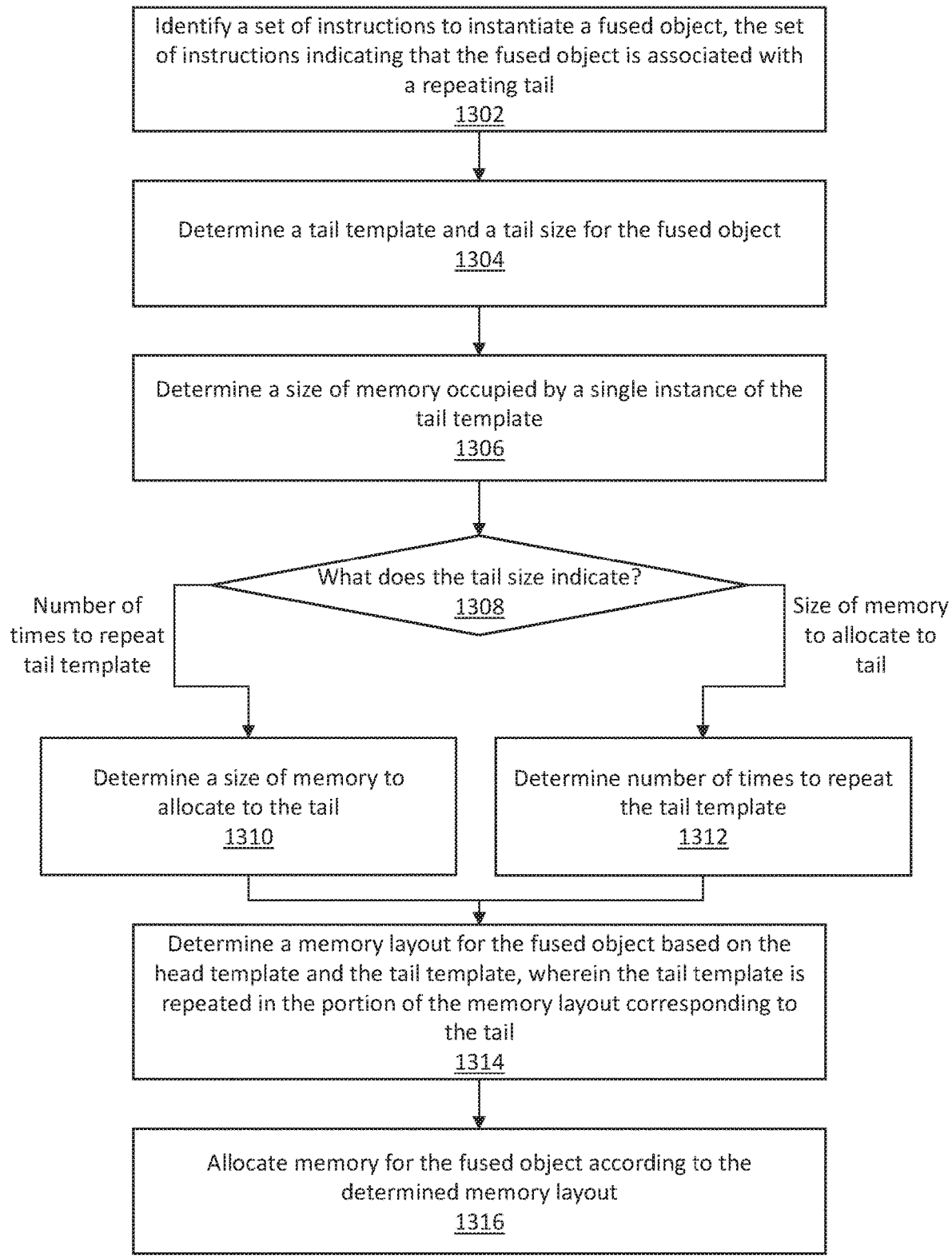
FIG. 13 illustrates an example set of operations for determining a memory layout for a fused object with a repeating tail in accordance with one or more embodiments.

FIG. 13 illustrates an example set of operations for determining a memory layout for a fused object with a repeating tail in accordance with one or more embodiments. One or more operations illustrated in FIG. 13 may be modified, rearranged, or omitted all together. Accordingly, the particular sequence of operations illustrated in FIG. 13 should not be construed as limiting the scope of one or more embodiments.

The operations illustrated in FIG. 13 may be executed by a compiler and/or a runtime environment. The operations illustrated in FIG. 13 may be executed during a compilation or runtime for a set of code.

One or more embodiments include identifying a set of one or more instructions to instantiate a fused object, the set of instructions indicating that the fused object is associated with a repeating tail (Operation 1302). A set of instructions to instantiate a fused object is identified in a set of code, such as source code, bytecode, and/or machine code.

The set of instructions indicate whether the fused object is associated with a repeating tail. The set of instructions may include, for example, assigning a value to a boolean variable that indicates that the fused object is associated with a repeating tail.

One or more embodiments include determining a tail template and a tail size for the fused object (Operation 1304). The set of code includes instructions specifying the tail template and tail size. The set of code may identify the tail template by specifying a pointer, name, and/or other identifier associated with the tail template.

The set of code may include instructions that assign a value to a size variable. The value assigned to the size variable indicates size information for the tail of the fused object, such as a number of times to repeat the tail template within the tail, and/or a size of memory to be allocated to the tail.

One or more embodiments include determining a size of memory occupied by a single instance of the tail template (Operation 1306). The size of memory occupied by a single instance of the tail template is the memory size corresponding to the types specified by the tail template. Examples for determining the memory size corresponding to the types specified by the tail template are described above with reference to Operation of FIG. 1004. First, the types specified by the tail template are determined. Second, the number of memory slots required for storing a value of each type is determined. Third, the total number of memory slots corresponding to all types specified by the tail template is determined. In an embodiment, the total number of memory slots is multiplied by the size of each memory slot to obtain the memory size occupied by a single instance of the tail template. In another embodiment, the memory size of each memory slot required for storing a value of each type is determined. The sum of the memory size for each memory slot is the memory size occupied by a single instance of the tail template.

As an example, a tail template specifies the types character, pointer, and long. The number of memory slots required for each type is determined. The character type may require one memory slot. The pointer type may require one memory slot. The long type may require two memory slots. Therefore, a total of four memory slots correspond to the types specified by the tail template 618. Each memory slot may be 4-byte wide. Hence, the memory size occupied by a single instance of the tail template may be 4×4=16 bytes.

One or more embodiments include determining what type of information is indicated by the tail size (Operation 1308). In an embodiment, the tail size indicates the number of times to repeat the tail template within the tail. In another embodiment, the tail size indicates a size of memory to allocate to the tail.

If the tail size indicates the number of times to repeat the tail template within the tail, then one or more embodiments include determining a size of memory to allocate to the tail (Operation 1310). The size of memory to allocate to the tail is the size of memory occupied by a single instance of the tail template, determined at Operation 1306, multiplied by the number of times to repeat the tail template, indicated by the tail size.

As an example, the tail size may indicate that the tail template is repeated three times within the tail of a fused object. The memory size occupied by a single instance of the tail template may be 16 bytes. Hence, the memory size to be allocated for the tail is 16×3=48 bytes.

Referring back to Operation 1308, if the tail size indicates a size of memory to allocate to the tail, then one or more embodiments include determining a number of times to repeat the tail template within the tail (Operation 1312). The number of times to repeat the tail template is the size of memory to allocate to the tail, indicated by the tail size, divided by the size of memory occupied by a single instance of the tail template, determined at Operation 1306.

As an example, the tail size may indicate that the memory size of the tail of a fused object is 64 bytes. The memory size occupied by a single instance of the tail template may be 16 bytes. Hence, the number of times to repeat the tail template within the tail is 64÷16=4 times.

One or more embodiments include determining a memory layout for the fused object based on the head template and the tail template, wherein the tail template is repeated in the portion of the memory layout corresponding to the tail (Operation 1314).

The memory layout for the head of the fused object is determined based on the head template, as described above with reference to Operation 1006 of FIG. 10.

The memory layout for the tail of the fused object is determined by repeating the tail template within the tail. A first region of the memory layout for the tail is determined based on the tail template, as described above with reference to Operation 1006 of FIG. 10. In an embodiment, the tail template specifies a set of types and a corresponding set of offsets in an embodiment. The offsets correspond to memory slots within the first region of the tail of the fused object. In another embodiment, the current tail template specifies a set of types without a corresponding set of offsets. The memory layout for the first region of the tail is determined based on a sequential layout of the set of types through the memory slots within the tail. After determining a memory layout for the first region of the memory layout for the tail, one or more additional regions of the tail are determined as having the same memory layout as that of the first region of the memory layout for the tail.

As an example, a tail template may indicate the type character. The character type may require one memory slot. The tail template may be repeated three times within the tail of the fused object.

A memory layout for a first region of the tail may be determined based on the tail template. The first region may include a first memory slot. The first memory slot may be associated with the character type. A memory layout for a second region of the tail may be the same as that for the first region. The second region may include a second memory slot. The second memory slot may be associated with the character type. A memory layout for a third region of the tail may be the same as that for the first region. The third region may include a third memory slot. The third memory slot may be associated with the character type. In summary, the tail includes the following sequence of types: character, character, character. In this example, the tail serves as a string of three characters.

As another example, a tail template may indicate the types character, pointer, and pointer. The character type may require one memory slot. The pointer type may require one memory slot. The tail template may be repeated two times within the tail of the fused object.

A first region of the tail template may include three memory slots. The first memory slot of the tail may be associated with the character type, the second memory slot may be associated with the pointer type, and the third memory slot may be associated with the pointer type. Then a second region of the tail has the same memory layout as the first region of the tail. Hence, the fourth memory slot of the tail may be associated with the character type, the fifth memory slot may be associated with the pointer type, and the sixth memory slot may be associated with the pointer type. In summary, the tail of the fused object includes the following sequence of types: character, pointer, pointer, character, pointer, pointer.

One or more embodiments include allocating memory for the fused object according to the determined memory layout (Operation 1316). Examples for allocating memory for the fused object according to the memory layout are described above with reference to Operation 1008 of FIG. 10.

7. Generating a Map of Pointers in Memory Based on Tail Templates

Figure 14:
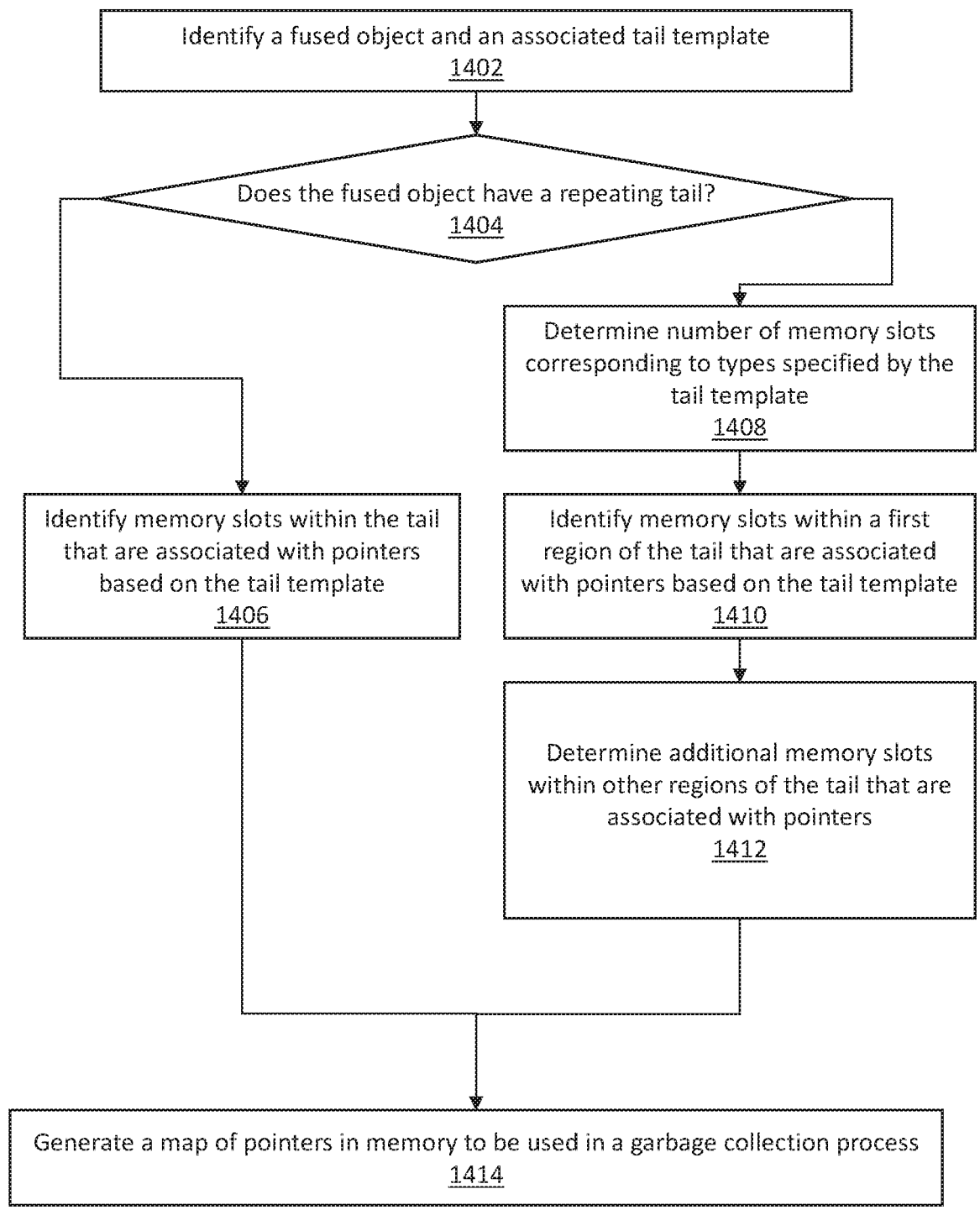
FIG. 14 illustrates an example set of operations for generating a map of pointers in memory in accordance with one or more embodiments.

FIG. 14 illustrates an example set of operations for generating a map of pointers in memory in accordance with one or more embodiments. One or more operations illustrated in FIG. 14 may be modified, rearranged, or omitted all together. Accordingly, the particular sequence of operations illustrated in FIG. 14 should not be construed as limiting the scope of one or more embodiments.

One or more embodiments include identifying a fused object and an associated tail template (Operation 1402). The fused object is identified in a heap memory. The fused object may be identified at the time that the fused object is instantiated. Additionally or alternatively the fused object may be identified during a garbage collection process. Additionally or alternatively the fused object may be identified during a process for generating a map of pointers in the memory.

The associated tail template is identified based on a pointer to the tail template included in the memory layout for the fused object. The pointer to the tail template may be included in the tail metadata of the fused object. Alternatively, the pointer to the tail template may be included in the head of the fused object.

One or more embodiments include determining whether the fused object is associated with a repeating tail (Operation 1404). A variable indicating whether the fused object is associated with a repeating tail is included in the memory layout for the fused object. The variable may be included in the tail metadata of the fused object. Alternatively, the variable may be included in the head of the fused object.

If the fused object does not have a repeating tail, then one or more embodiments include identifying memory slots within the tail that are associated with pointers based on the tail template (Operation 1406). The memory layout of the tail is determined based on the tail template, as described above with reference to Operation 1006 of FIG. 10.

In an embodiment, the tail template specifies a set of types and a corresponding set of offsets in an embodiment. The offsets correspond to memory slots within the tail of the fused object. The offsets that correspond to the pointer type are identified. The identified offsets indicate the memory slots that are associated with pointers.

As an example, a tail template may specify a type integer corresponding to the offset 0, and a type pointer corresponding to the offset 1. Based on the tail template, the second memory slot of the tail (which corresponds to the offset 1) is associated with the type pointer.

In another embodiment, the current tail template specifies a set of types without a corresponding set of offsets. The memory layout for the tail is determined based on a sequential layout of the set of types through the memory slots within the tail. Based on the memory layout, the memory slots that are associated with pointers are identified.

As an example, a tail template may specify the types integer and pointer. The types integer and pointer may each fit into one memory slot. Hence, the tail of the fused object includes a first memory slot associated with the type integer, and a second memory slot associated with the type pointer.

If the fused object has a repeating tail, then one or more embodiments include determining a number of memory slots corresponding to types specified by the tail template (Operation 1408). Examples for determining the number of memory slots corresponding to types specified by the tail template are described above with reference to Operation 1306 of FIG. 13.

One or more embodiments include identifying memory slots within a first region of the tail that are associated with pointers based on the tail template (Operation 1410). The number of memory slots in the first region is the number of memory slots corresponding to types specified by the tail template, determined at Operation 1408. Memory slots within the first region of the tail that are associated with pointers are identified based on the tail template, using similar methods as described above with reference to Operation 1406.

One or more embodiments include determining additional memory slots within other regions of the tail that are associated with pointers (Operation 1412). Each region of the tail includes a number of memory slots that is equal to the number of memory slots corresponding to types specified by the tail template, determined at Operation 1408. A memory layout for each region of the tail is the same as the memory layout for the first region of the tail, determined at Operation 1410.

Offsets of memory slots within the first region of the tail that are associated with pointers are identified. Memory slots within the additional regions of the tail are determined by adding (a) each offset of a memory slot within the first region of the tail that is associated with a pointer and (b) a multiple of the number of memory slots per region.

As an example, a tail template may specify the types character, integer, and pointer. The character type may require one memory slot. The integer type may require one memory slot. The pointer type may require one memory slot. The tail template may be repeated three times within a tail of a fused object.

The number of memory slots corresponding to the types specified by the tail template is three. Hence, each region within the tail of the fused object includes three memory slots.

Based on the tail template, pointers within the first region are identified. The third memory slot is identified as being associated with a pointer. The offset of the third memory slot is 2.

Memory slots in the second region that are associated with pointers are determined by adding (a) the offset of the memory slot in the first region that is associated with a pointer (that is, 2), and (b) the number of memory slots per region (that is, 3). Hence, the offset of a memory slot within the second region that is associated with a pointer is 2+3=5. The sixth memory slot (corresponding to the offset 5) is associated with a pointer.

Memory slots in the third region that are associated with pointers are determined by adding (a) the offset of the memory slot in the first region that is associated with a pointer (that is, 2), and (b) two times the number of memory slots per region (that is, 6). Hence, the offset of a memory slot within the third region that is associated with a pointer is 2+6=8. The ninth memory slot (corresponding to the offset 8) is associated with a pointer.

In this example, therefore, the third memory slot, the sixth memory slot, and the ninth memory slot are associated with the pointer type. Locations of pointers within the memory layout for the tail of the fused object are determined based on locations of pointers within the tail template, without necessarily inspecting the memory slots within the tail of the fused object.

One or more embodiments include generating a map of pointers in the memory. (Operation 1414). The map may be used in a garbage collection process.

The map of pointers indicates which memory slots and/or memory addresses are associated with pointers. The map of pointers includes the memory slots that are associated with pointers as determined at Operation 1406. Alternatively, the map of pointers includes the memory slots that are associated with pointers as determined at Operation 1410 and Operation 1412.

As an example, the third memory slot, the sixth memory slot, and the ninth memory slot within a tail of a fused object may be determined as being associated with the pointer type. The map of pointers may be generated. The map of pointers may indicate that the third memory slot, the sixth memory slot, and the ninth memory slot are associated with the pointer type.

Additionally or alternatively, the map of pointers may indicate memory locations that are associated with the pointer type. In a 64-bit machine, each memory slot is associated with 8 bytes. A starting memory address of the tail of the fused object may be identified. A memory address that is 16 bytes away from the starting memory address of the tail corresponds to the third memory slot within the tail. A memory address that is 40 bytes away from the starting memory address corresponds to the sixth memory slot within the tail. A memory address that is 64 bytes away from the starting memory address corresponds to the sixth memory slot within the tail. The map of pointers may indicate that the memory addresses that are 16 bytes, 40 bytes, and 64 bytes away from the starting memory address of the tail are associated with the pointer type.

During a garbage collection process, a garbage collector begins with a root set of objects. The garbage collector recursively traces the pointers associated with each object that is traversed. The traced objects are determined to be live objects. Any objects (or memory space) that is not traced may be discarded from the heap memory.

For a more efficient garbage collection process, the garbage collector identifies the pointers associated with each object using a map of pointers. The garbage collector identifies an offset or memory location specified by the map of pointers. The garbage collector reads the value stored at that offset or memory location to retrieve the next object to be traced. By using the map of pointers, the garbage collector does not necessarily inspect each memory slot of an object to determine which memory slots are associated with pointers.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 15:
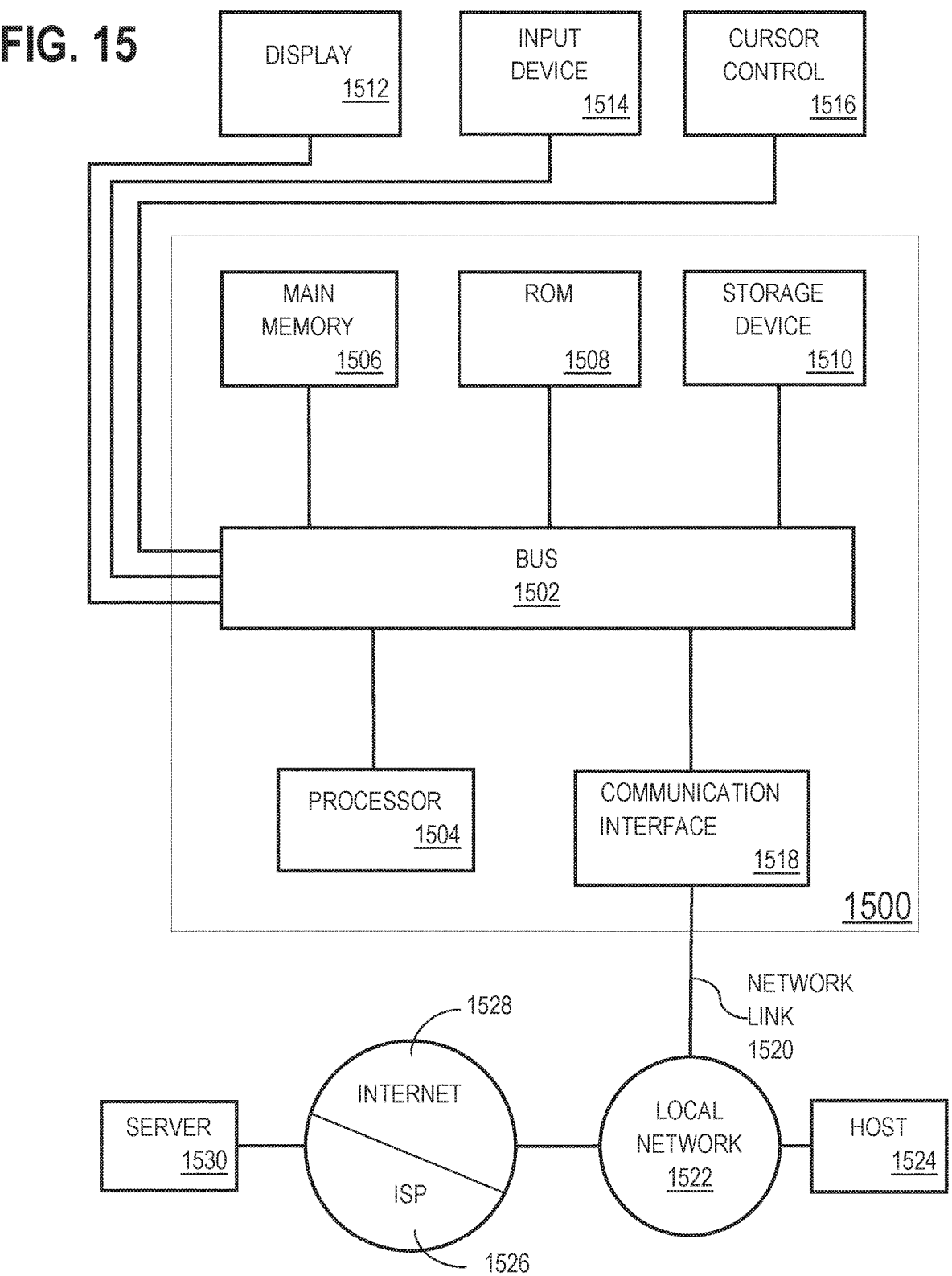
FIG. 15 illustrates a system in accordance with one or more embodiments.

For example, FIG. 15 is a block diagram that illustrates a computer system 1500 upon which an embodiment of the invention may be implemented. Computer system 1500 includes a bus 1502 or other communication mechanism for communicating information, and a hardware processor 1504 coupled with bus 1502 for processing information. Hardware processor 1504 may be, for example, a general purpose microprocessor.

Computer system 1500 also includes a main memory 1506, such as a random access memory (RAM) or other dynamic storage device, coupled to bus 1502 for storing information and instructions to be executed by processor 1504. Main memory 1506 also may be used for storing temporary variables or other intermediate information during execution of instructions to be executed by processor 1504. Such instructions, when stored in non-transitory storage media accessible to processor 1504, render computer system 1500 into a special-purpose machine that is customized to perform the operations specified in the instructions.

Computer system 1500 further includes a read only memory (ROM) 1508 or other static storage device coupled to bus 1502 for storing static information and instructions for processor 1504. A storage device 1510, such as a magnetic disk or optical disk, is provided and coupled to bus 1502 for storing information and instructions.

Computer system 1500 may be coupled via bus 1502 to a display 1512, such as a cathode ray tube (CRT), for displaying information to a computer user. An input device 1514, including alphanumeric and other keys, is coupled to bus 1502 for communicating information and command selections to processor 1504. Another type of user input device is cursor control 1516, such as a mouse, a trackball, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane.

Computer system 1500 may implement the techniques described herein using customized hard-wired logic, one or more ASICs or FPGAs, firmware and/or program logic which in combination with the computer system causes or programs computer system 1500 to be a special-purpose machine. According to one embodiment, the techniques herein are performed by computer system 1500 in response to processor 1504 executing one or more sequences of one or more instructions contained in main memory 1506. Such instructions may be read into main memory 1506 from another storage medium, such as storage device 1510. Execution of the sequences of instructions contained in main memory 1506 causes processor 1504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1510. Volatile media includes dynamic memory, such as main memory 1506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1502. Transmission media can also take the form of acoustic or light waves, such as those generated during radio-wave and infra-red data communications.

Various forms of media may be involved in carrying one or more sequences of one or more instructions to processor 1504 for execution. For example, the instructions may initially be carried on a magnetic disk or solid state drive of a remote computer. The remote computer can load the instructions into its dynamic memory and send the instructions over a telephone line using a modem. A modem local to computer system 1500 can receive the data on the telephone line and use an infra-red transmitter to convert the data to an infra-red signal. An infra-red detector can receive the data carried in the infra-red signal and appropriate circuitry can place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be an integrated services digital network (ISDN) card, cable modem, satellite modem, or a modem to provide a data communication connection to a corresponding type of telephone line. As another example, communication interface 1518 may be a local area network (LAN) card to provide a data communication connection to a compatible LAN. Wireless links may also be implemented. In any such implementation, communication interface 1518 sends and receives electrical, electromagnetic or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the world wide packet data communication network now commonly referred to as the "Internet" 1528. Local network 1522 and Internet 1528 both use electrical, electromagnetic or optical signals that carry digital data streams. The signals through the various networks and the signals on network link 1520 and through communication interface 1518, which carry the digital data to and from computer system 1500, are example forms of transmission media.

Computer system 1500 can send messages and receive data, including program code, through the network(s), network link 1520 and communication interface 1518. In the Internet example, a server 1530 might transmit a requested code for an application program through Internet 1528, ISP 1526, local network 1522 and communication interface 1518.

The received code may be executed by processor 1504 as it is received, and/or stored in storage device 1510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
   identifying a set of one or more instructions to instantiate a fused object associated with a head and a repeating tail;
   determining a tail template to be repeated in the repeating tail;

determining a memory layout for the fused object, wherein determining the memory layout for the fused object comprises:
  repeating the tail template in the repeating tail;
allocating a particular portion of memory for the fused object according to the memory layout;
wherein the tail template indicates a plurality of types corresponding respectively to a plurality of offsets;
wherein repeating the tail template in the repeating tail comprises:
  determining that a first set of offsets in the repeating tail correspond respectively to the plurality of types; and
  determining that a second set of offsets, subsequent to the first set of offsets, in the repeating tail correspond respectively to the plurality of types,
wherein the method is performed by at least one device including a hardware processor.

2. The method of claim 1, further comprising:
determining a portion of the memory layout that is associated with the head based on a head template.

3. A system, comprising:
at least one device including a hardware processor; and
the system being configured to perform operations comprising:
identifying a set of one or more instructions to instantiate a fused object associated with a head and a repeating tail;
determining a tail template to be repeated in the repeating tail;
determining a memory layout for the fused object, wherein determining the memory layout for the fused object comprises:
  repeating the tail template in the repeating tail;
allocating a particular portion of memory for the fused object according to the memory layout;
wherein the tail template indicates a plurality of types corresponding respectively to a plurality of offsets;
wherein repeating the tail template in the repeating tail comprises:
  determining that a first set of offsets in the repeating tail correspond respectively to the plurality of types; and
  determining that a second set of offsets, subsequent to the first set of offsets, in the repeating tail correspond respectively to the plurality of types.

4. The system of claim 3, wherein the operations further comprise:
determining a portion of the memory layout that is associated with the head based on a head template.

5. The system of claim 4, wherein the head template for the head is not modifiable, and the tail template for the repeating tail is modifiable.

6. One or more non-transitory machine-readable media storing instructions which, when executed by one or more processors, cause:
identifying a set of one or more instructions to instantiate a fused object associated with a head and a repeating tail;
determining a tail template to be repeated in the repeating tail;
determining a memory layout for the fused object, wherein determining the memory layout for the fused object comprises:
  repeating the tail template in the repeating tail;
allocating a particular portion of memory for the fused object according to the memory layout;
wherein the tail template indicates a plurality of types corresponding respectively to a plurality of offsets;
wherein repeating the tail template in the repeating tail comprises:
  determining that a first set of offsets in the repeating tail correspond respectively to the plurality of types; and
  determining that a second set of offsets, subsequent to the first set of offsets, in the repeating tail correspond respectively to the plurality of types.

7. The one or more media of claim 6, further storing instructions which, when executed by the one or more processors, cause:
determining a portion of the memory layout that is associated with the head based on a head template.

8. The one or more media of claim 7, wherein the head template for the head is not modifiable, and the tail template for the repeating tail is modifiable.

9. The one or more media of claim 6, further storing instructions which, when executed by the one or more processors, cause:
determining a number of times to repeat the tail template in the repeating tail as specified by the set of instructions;
determining a size of memory occupied by a single instance of the tail template based on types specified by the tail template;
determining a size of memory to allocate to the repeating tail based on (a) the number of times to repeat the tail template in the repeating tail and (b) the size of memory occupied by the single instance of the tail template.

10. The one or more media of claim 6, further storing instructions which, when executed by the one or more processors, cause:
determining a size of memory to be allocated to the repeating tail as specified by the set of instructions;
determining a size of memory occupied by a single instance of the tail template based on types specified by the tail template;
determining a number of times to repeat the tail template in the repeating tail based on (a) the size of memory to be allocated to the repeating tail and (b) the size of memory occupied by a single instance of the tail template.

11. The one or more media of claim 6, further storing instructions which, when executed by the one or more processors cause:
based on the tail template indicating a plurality of types:
  interpreting respective values stored at a first set of memory locations, within the repeating tail, as being respectively associated with the plurality of types; and
  interpreting respective values stored at a second set of memory locations, within the repeating tail, as being respectively associated with the plurality of types.

12. The one or more media of claim 6, further storing instructions which, when executed by the one or more processors cause:
determining that a first set of memory slots within a first instance of the tail template in the repeating tail is associated with pointers, wherein determining that the first set of memory slots is associated with pointers comprises:
  determining a set of memory slots respectively corresponding to types specified by the tail template;
  identifying a subset of the set of memory slots that is associated with pointers as specified by the tail template;
  determining that the first set of memory slots, within the first instance of the tail template, correspond to the subset of the set of memory slots that is associated with pointers as specified by the tail template;
determining that a second set of memory slots within a second instance of the tail template in the repeating tail is associated with pointers, wherein determining that the second set of memory slots is associated with pointers comprises:
determining a count associated with the set of memory slots respectively corresponding to the types specified by the tail template;
adding the count to each of the first set of memory slots to determine the second set of memory slots.

13. The one or more media of claim 12, further storing instructions which, when executed by the one or more processors cause:
generating a map of pointers in the memory, wherein the map of pointers includes (a) the first set of memory slots, within the first instance of the tail template in the repeating tail, and (b) the second set of memory slots, within the second instance of the tail template in the repeating tail.

14. The one or more media of claim 13, wherein a garbage collection process determines which memory slots, within the memory, are associated with pointers using the map of pointers.

15. One or more non-transitory machine-readable media storing instructions which, when executed by one or more processors, cause:
identifying a set of one or more instructions to instantiate a fused object associated with a head and a repeating tail;
determining a tail template to be repeated in the repeating tail;
determining a number of times to repeat the tail template in the repeating tail as specified by the set of instructions;
determining a size of memory occupied by a single instance of the tail template based on types specified by the tail template;
determining a size of memory to allocate to the repeating tail based on (a) the number of times to repeat the tail template in the repeating tail and (b) the size of memory occupied by the single instance of the tail template;
determining a memory layout for the fused object, wherein determining the memory layout for the fused object comprises: repeating the tail template in the repeating tail;
allocating a particular portion of memory for the fused object according to the memory layout.

16. One or more non-transitory machine-readable media storing instructions which, when executed by one or more processors, cause:
identifying a set of one or more instructions to instantiate a fused object associated with a head and a repeating tail;
determining a tail template to be repeated in the repeating tail;
determining a size of memory to be allocated to the repeating tail as specified by the set of instructions;
determining a size of memory occupied by a single instance of the tail template based on types specified by the tail template;
determining a number of times to repeat the tail template in the repeating tail based on (a) the size of memory to be allocated to the repeating tail and (b) the size of memory occupied by a single instance of the tail template;
determining a memory layout for the fused object, wherein determining the memory layout for the fused object comprises: repeating the tail template in the repeating tail;
allocating a particular portion of memory for the fused object according to the memory layout.

17. One or more non-transitory machine-readable media storing instructions which, when executed by one or more processors, cause:
identifying a set of one or more instructions to instantiate a fused object associated with a head and a repeating tail;
determining a tail template to be repeated in the repeating tail;
determining a memory layout for the fused object, wherein determining the memory layout for the fused object comprises:
repeating the tail template in the repeating tail;
allocating a particular portion of memory for the fused object according to the memory layout;
based on the tail template indicating a plurality of types:
interpreting respective values stored at a first set of memory locations, within the repeating tail, as being respectively associated with the plurality of types; and
interpreting respective values stored at a second set of memory locations, within the repeating tail, as being respectively associated with the plurality of types.

18. One or more non-transitory machine-readable media storing instructions which, when executed by one or more processors, cause:
identifying a set of one or more instructions to instantiate a fused object associated with a head and a repeating tail;
determining a tail template to be repeated in the repeating tail;
determining a memory layout for the fused object, wherein determining the memory layout for the fused object comprises:
repeating the tail template in the repeating tail;
allocating a particular portion of memory for the fused object according to the memory layout;
determining that a first set of memory slots within a first instance of the tail template in the repeating tail is associated with pointers, wherein determining that the first set of memory slots is associated with pointers comprises:
determining a set of memory slots respectively corresponding to types specified by the tail template;
identifying a subset of the set of memory slots that is associated with pointers as specified by the tail template;
determining that the first set of memory slots, within the first instance of the tail template, correspond to the subset of the set of memory slots that is associated with pointers as specified by the tail template;
determining that a second set of memory slots within a second instance of the tail template in the repeating tail is associated with pointers, wherein determining that the second set of memory slots is associated with pointers comprises:
determining a count associated with the set of memory slots respectively corresponding to the types specified by the tail template;
adding the count to each of the first set of memory slots to determine the second set of memory slots.

19. The one or more media of claim 18, further storing instructions which, when executed by the one or more processors cause:
    generating a map of pointers in the memory, wherein the map of pointers includes (a) the first set of memory slots, within the first instance of the tail template in the repeating tail, and (b) the second set of memory slots, within the second instance of the tail template in the repeating tail.

20. The one or more media of claim 18, wherein a garbage collection process determines which memory slots, within the memory, are associated with pointers using the map of pointers.

\* \* \* \* \*